(12) United States Patent
Bergdahl et al.

(10) Patent No.: US 12,302,883 B2
(45) Date of Patent: May 20, 2025

(54) FISHING ROD PLATFORMS AND METHODS FOR THE USE THEREOF

(71) Applicant: Bayou City Industries LLC, Houston, TX (US)

(72) Inventors: Matthew Bergdahl, Houston, TX (US); Caren Bergdahl, Houston, TX (US)

(73) Assignee: Bayou City Industries LLC, Houston, TX (US)

( * ) Notice: Subject to any disclaimer, the term of this patent is extended or adjusted under 35 U.S.C. 154(b) by 365 days.

(21) Appl. No.: 18/099,149

(22) Filed: Jan. 19, 2023

(65) Prior Publication Data

US 2023/0232806 A1    Jul. 27, 2023

Related U.S. Application Data

(60) Provisional application No. 63/301,750, filed on Jan. 21, 2022.

(51) Int. Cl.
*A01K 97/10*    (2006.01)
(52) U.S. Cl.
CPC .................... *A01K 97/10* (2013.01)
(58) Field of Classification Search
CPC ..................................... A01K 97/10
USPC .......................................... 43/21.2
See application file for complete search history.

(56) References Cited

U.S. PATENT DOCUMENTS

| | | | | | |
|---|---|---|---|---|---|
| 4,112,607 | A | * | 9/1978 | Scher | A01K 97/10 43/17 |
| 4,231,178 | A | * | 11/1980 | Black | A01K 91/06 43/16 |
| 4,443,963 | A | * | 4/1984 | Braaten | A01K 97/10 43/21.2 |
| 4,677,784 | A | * | 7/1987 | Butkus | A01K 97/10 43/16 |
| 7,686,276 | B1 | * | 3/2010 | McCauley | A01K 97/10 248/538 |
| 2022/0394969 | A1 | * | 12/2022 | Davila | A01K 97/10 |

\* cited by examiner

*Primary Examiner* — Christopher D Hutchens
*Assistant Examiner* — Steven J Shur
(74) *Attorney, Agent, or Firm* — William R. Childs; Childs Patent Law PLLC

(57) ABSTRACT

The present disclosure relates to fishing rod platforms that can be modular and capable of adding functional arms. Benefits of the fishing rod platforms can include a superior device for holding and securing fishing rods to the ground and adding functional arms that allow the fishing rod platform to hold items, such as a cellphone holder, an awning, a cup holder, and other such useful holders.

15 Claims, 14 Drawing Sheets

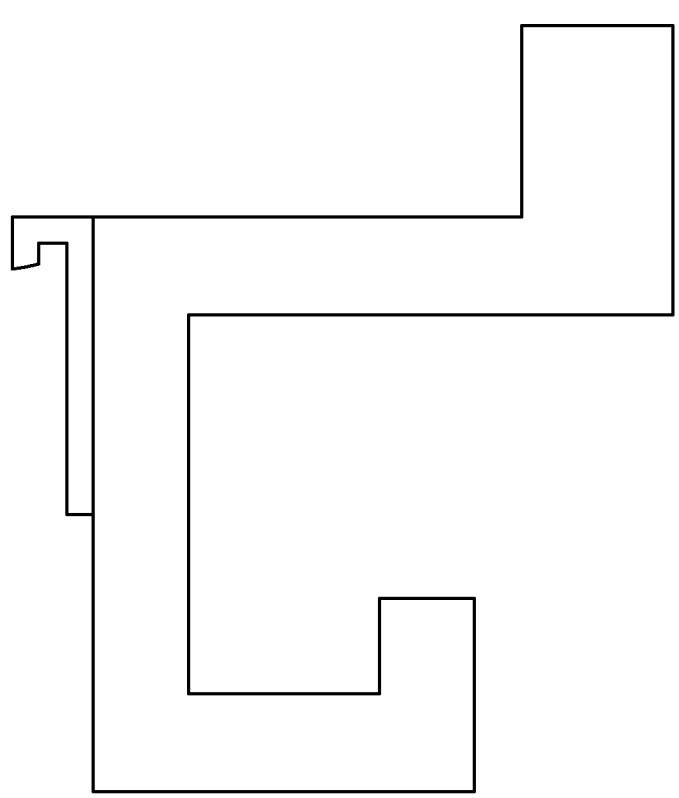 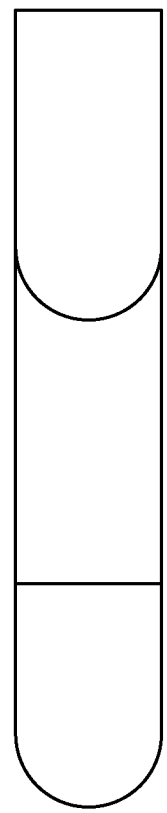
FIG. 14A　　　　　　　　　FIG. 14B
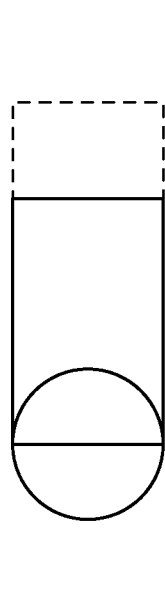 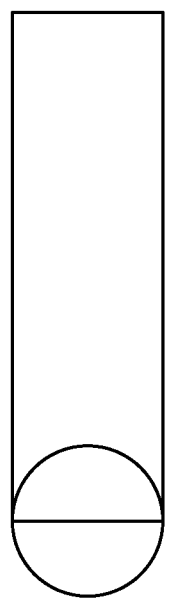
FIG. 14C　　　FIG. 14D

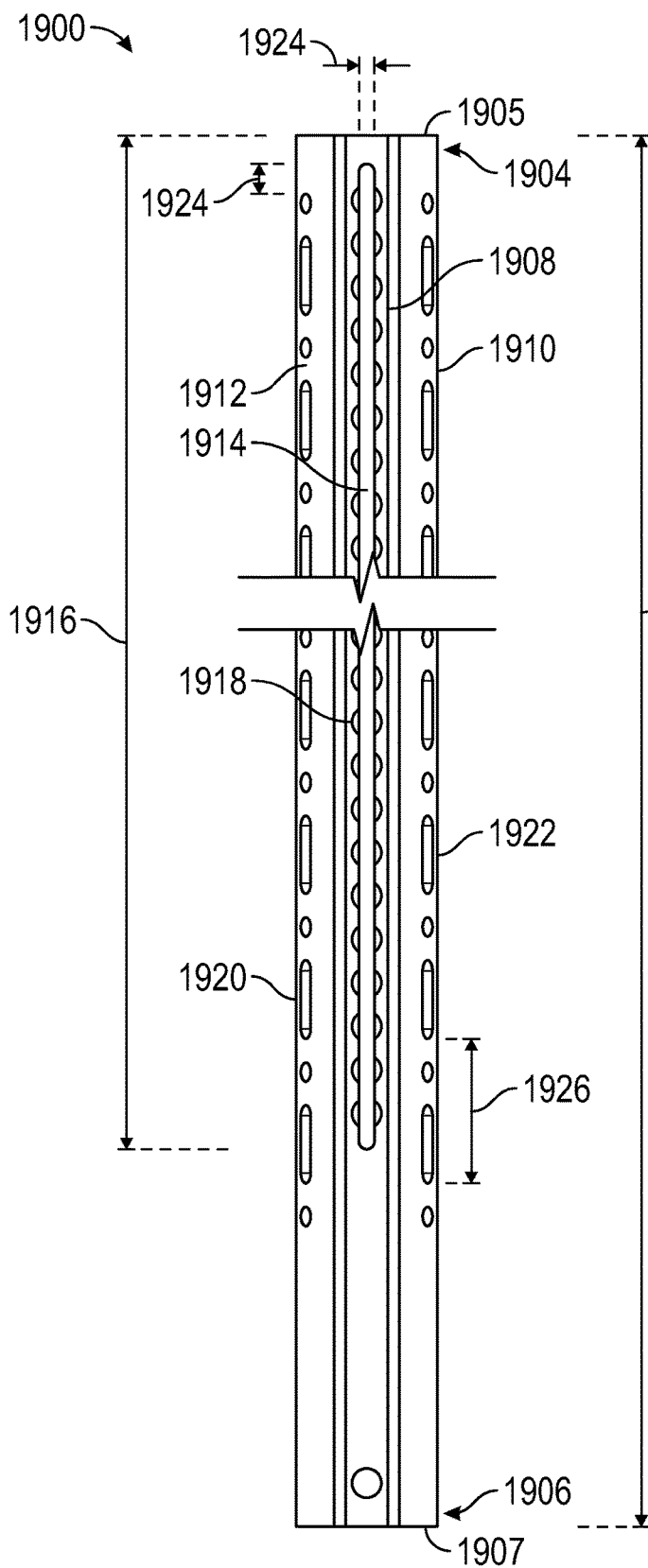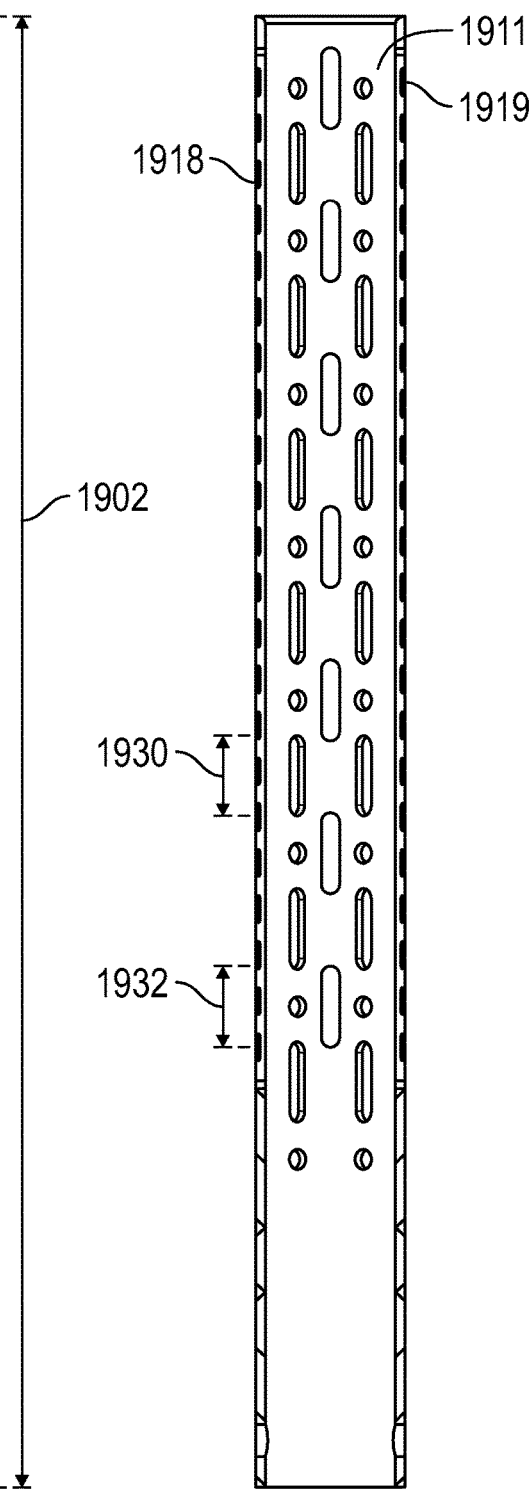
FIG. 19A
FIG. 19B

FISHING ROD PLATFORMS AND METHODS FOR THE USE THEREOF

CROSS-REFERENCE TO RELATED APPLICATIONS

This application claims priority to U.S. Provisional Application No. 63/301,750 filed on Jan. 21, 2022, entitled "FISHING ROD PLATFORMS AND METHODS FOR THE USE THEREOF," the entirety of which is incorporated by reference.

TECHNICAL FIELD

The present disclosure relates to fishing rod platforms that can be modular and are capable of adding functional arms. Benefits of the fishing rod platforms can include a superior device for holding and securing fishing rods to the ground and can add functional arms that allow the fishing rod platform to position one or more items, such as a cellphone holder, an awning, a cup holder, and other such useful holders.

BACKGROUND

Fishing is the activity of trying to catch fish. A fisher is someone who engages in fishing. Fishing can basically be divided into commercial fishing and recreational fishing. Recreational fishing is performed for pleasure or as part of a sport. According to various sources, the total estimated number of recreational fishers in the world ranges from 220 million to 700 million. Recreational fishing can be performed by holding a fishing pole during the entire act of fishing.

However, many fishers would greatly prefer to avoid having to hold the fishing pole the entire time. Fishing rod holders have been developed for fixed positions, such as on a dock or on a fishing boat. For example, many fishing boats have a fishing rod holder mounted to the stern or the side of the boat, so that the fisher does not need to hold the fishing rod the entire time. Instead, the fisher can relax until the fishing rod shows signs of having caught something. Then the fisher can try to reel the fish in.

But what of fishers who desire to go fishing in beautiful remote locations . . . without bringing their own fishing boat?

In practice, these fishers have to drive and/or hike to a remote location and haul at least the fishing rod, bait, and a fishing rod holder to a fishing spot. Once the fisher has found a remote fishing spot, they need to find a way to hold their fishing rod or to find a place to mount their fishing rod.

There is a need for improved fishing rod holders for fishing in remote locations. There is a need for fishing rod holders that can be easily transported to remote locations and secured safely to the ground.

SUMMARY

A fishing rod platform is disclosed herein. In certain embodiments, fishing rod platform includes a fishing rod holder, wherein the fishing rod holder has a hollow tubular shape and includes a top end, a bottom end, a front face, a back face, a right face, a left face, and an inner surface, wherein the top end has a top opening that includes a top lip and the bottom end has a bottom opening that includes a bottom lip, wherein the fishing rod holder has a front slit that passes through the front face to the inner surface and extends a front slit distance from the top lip toward the bottom end and has a plurality of front notches spaced along the front slit distance, and wherein the fishing rod holder has a back slit that passes through the back face to the inner surface and extends a back slit distance from the top lip toward the bottom end and has a plurality of back notches spaced along the back slit distance, wherein the fishing rod holder has one or more left openings that pass through the left face to the inner surface, and wherein the fishing rod holder has one or more right openings that pass through the right face to the inner surface.

In some embodiments, the fishing rod holder has a holder length of from about 50.0 cm to about 250.0 cm, or wherein a longest distance across an inner surface of the top lip is from about 5.0 cm to about 17.0 cm, or wherein a longest distance across an inner surface of the bottom lip is from about 5.0 cm to about 17.0 cm, or wherein a thickness of the fishing rod holder from the front face to the inner surface is from about 0.3 cm to about 2.0 cm, or wherein a shape of the top opening or the bottom opening is circular, or wherein a shape of the top opening or the bottom opening is ovular, elliptical, rectangular, pentagonal, hexagonal, heptagonal, or octagonal. In some embodiments, the front slit has a front gap width of from about 3.0 mm to about 20.0 mm; or wherein the back slit has a back gap width of from about 3.0 mm to about 20.0 mm; or wherein the fishing rod holder has from 2 to about 50 front notches, and wherein a front notch closest to the top lip has a center located about 0.5 cm from the top lip, or wherein a front notch closest to the bottom lip has a center located about 0.5 cm from the bottom lip; or wherein the front notches have a spacing of about 0.5 cm to about 25.0 cm between adjacent centers of a majority of the front notches; or wherein the fishing rod holder has from 2 to about 50 back notches, and wherein a back notch closest to the top lip has a center located about 0.5 cm from the top lip, or wherein a back notch closest to the bottom lip has a center located about 0.5 cm from the bottom lip; or wherein the back notches have a spacing of about 0.5 cm to about 25.0 cm between adjacent centers of a majority of the front notches. In some embodiments, the one or more left openings include from 2 to about 100 left openings, wherein the left openings have a left bottom lip that is substantially perpendicular to a length of the fishing rod holder or wherein the left openings are located in pairs oriented substantially perpendicular to a length of the fishing rod holder, and wherein the left openings form an array of pairs of left openings spaced at different distances from the top lip, or wherein the one or more right openings include from 2 to about 100 right openings, wherein the right openings have a right bottom lip that is substantially perpendicular to a length of the fishing rod holder or wherein the right openings are located in pairs oriented substantially perpendicular to a length of the fishing rod holder, and wherein the right openings form an array of pairs of right openings spaced at different distances from the top lip. In some embodiments, the fishing rod platform further includes a ground spike, wherein the ground spike has a driving mechanism on top, a ground blade on bottom, and a fastening mount located between and connected to the driving mechanism and the ground blade, wherein the driving mechanism includes a driving top and a driving bottom, wherein the bottom lip of the fishing rod holder can fit over the driving top of the driving mechanism such that the bottom lip directly contacts a top of the fastening mount, and the fastening mount and the bottom of the fishing rod holder have a complementary fastening mechanism configured to allow the fishing rod holder to be reversibly fastened to the fastening mount. In some embodiments, the ground blade has a blade length of about 8.0 cm to about 55.0 cm; or wherein the ground blade has a curved shape along an axis substantially parallel to the length of the ground blade. In some embodiments, the complementary fastening mechanism includes a tongue and groove, complimentary threading, a hook and loop, or complementary holes securable with a pin, a ball lock pin, a ball lock pin with pull ring, or a nut and bolt; or wherein the complementary fastening mechanism includes a pair of L-shaped, J-shaped, or V-shaped tongue and groove locks disposed around the fastening mount such that rotating the fishing rod holder in a fastening direction relative to the fastening mount fastens the fishing rod holder to the fastening mount and rotating the fishing rod holder in a direction opposite the fastening direction unfastens the fishing rod holder from the fastening mount. In some embodiments, the fastening mount has hollow tubular shape and includes a mount top end having a mount top lip and mount bottom end having a mount bottom lip, and wherein the mount top end and mount bottom end have one or more holes passing from an exterior of the fastening mount to an interior of the fastening mount are complementary to one or more holes in the ground blade and driving mechanism. In some embodiments, the driving mechanism include one or more handles; or wherein the driving mechanism includes a driving top and a driving bottom, wherein the driving top is capable of being inserted into the bottom opening of the fishing rod holder; or wherein the driving mechanism includes two adjustable handles capable of being fixed in a driving position or a collapsed position, wherein the driving position orients a length of the handles in a direction substantially perpendicular to a length of the ground blade and the collapsed position orients the length of the handles substantially parallel to the length of the ground blade, and the fishing rod holder is capable of fitting over the driving top and being fastened to the fastening mount when the handles of the driving mechanism are in the collapsed position. In some embodiments, the fishing rod platform further includes a clip, wherein the clip has one or more teeth and is configured to reversibly attach to the one or more left openings or the one or more right openings of the fishing rod holder. In some embodiments, the fishing rod platform further includes a clip, wherein the clip has a clip body, two or more teeth, and a functional arm, wherein the clip body has an inner surface having a curvature that complements a curvature of the front face, the back face, the right face, or the left face of the fishing rod holder, wherein the two or more teeth extend from the clip body toward a radius of curvature of the clip body and are complementary to a portion of the one or more right openings or a portion of the one or more left openings such that the teeth of a clip are capable of being hooked through the portion of the one or more right openings or the portion of the one or more left openings; or wherein the clip has a clip body, two teeth, and a functional arm, wherein the clip body has an inner surface having a curvature that complements a curvature of the front face, the back face, the right face, or the left face of the fishing rod holder, wherein the two teeth extend from the clip body toward a radius of curvature of the clip body and are complementary to a pair of the one or more right openings or a pair of the one or more left openings such that the teeth of a clip are capable of being hooked through the pair of the one or more right openings or the pair of the one or more left openings. In some embodiments, the functional arm includes a plurality of hooks, an arm bearing a cup holder, an arm bearing an awning, and an arm bearing a plate or fish cleaning station, bait rod holder, mobile device holder, or a combination thereof, wherein the mobile device holder is configured to hold a cell phone, a computer tablet, a display screen, a camera, a fish finder, a flashlight, or a combination thereof.

A method of assembling a fishing rod platform is disclosed herein. In certain embodiments, the method of assembling a fishing rod platform includes: providing a fishing rod holder, wherein the fishing rod holder has a hollow tubular shape and includes a top end, a bottom end, a front face, a back face, a right face, a left face, and an inner surface, wherein the top end has a top opening that includes a top lip and the bottom end has a bottom opening that includes a bottom lip, wherein the fishing rod holder has a front slit that passes through the front face to the inner surface and extends a front slit distance from the top lip toward the bottom end and has a plurality of front notches spaced along the front slit distance, and wherein the fishing rod holder has a back slit that passes through the back face to the inner surface and extends a back slit distance from the top lip toward the bottom end and has a plurality of back notches spaced along the back slit distance, wherein the fishing rod holder has one or more left openings that pass through the left face to the inner surface, and wherein the fishing rod holder has one or more right openings that pass through the right face to the inner surface, and providing a ground spike, wherein the ground spike has a driving mechanism on top, a ground blade on bottom, and a fastening mount located between the driving mechanism and the ground blade, wherein the driving mechanism includes a driving top and a driving bottom, wherein the bottom lip of the fishing rod holder can fit over the driving top of the driving mechanism into direct contact with the fastening mount, and the fastening mount and the bottom of the fishing rod holder have a complementary fastening mechanism configured to allow the fishing rod holder to be reversibly fastened to the fastening mount, positioning the lower lip of the fishing rod holder into contact with the fastening mount, forming the assembled fishing rod platform by fastening the fishing rod holder to the fastening mount.

In some embodiments, the method further includes: before, during, or after forming the assembled fishing rod platform, driving the ground blade in sand, gravel, dirt, mud, or any surface terranean feature. In some embodiments, the method further includes providing a clip, wherein the clip has a clip body, two or more teeth, and a functional arm, wherein the clip body has an inner surface having a curvature that complements a curvature of the front face, the back face, the right face, or the left face of the fishing rod holder, wherein the two or more teeth extend from the clip body toward a radius of curvature of the clip body and are complementary to a portion of the one or more right openings or a portion of the one or more left openings such that the teeth of a clip are capable of being hooked through the portion of the one or more right openings or the portion of the one or more left openings, and fastening the clip onto the left face by passing two or more teeth of the clip through the portion of the one or more left openings, or fastening the clip onto the right face by passing two or more teeth of the clip through the portion of the one or more right openings.

BRIEF DESCRIPTION OF THE DRAWINGS

The foregoing summary, as well as the following detailed description of the embodiments, will be better understood when read in conjunction with the attached drawings. For the purpose of illustration, there are shown in the drawings some embodiments, which may be preferable. It should be understood that the embodiments depicted are not limited to the precise details shown. The drawings are not to scale.

FIG. 14 is a schematic depiction of an embodiment of a clip having a double hook, with FIG. 14A as a sideview, FIG. 14B as a front view, and both FIGS. 14C and 14D as a top view.

FIG. 19A is a schematic depiction of a side view of an embodiment of the fishing rod holder of the fishing rod platform shown in FIG. 18.

FIG. 19B is a schematic depiction of a cut-away diagram, viewed from the right side, of the embodiment of the fishing rod holder shown in FIG. 18.

DETAILED DESCRIPTION

Unless otherwise noted, all measurements are in standard metric units.

Unless otherwise noted, all instances of the words "a," "an," or "the" can refer to one or more than one of the word that they modify.

Unless otherwise noted, the term "about" refers to ±10% of the non-percentage number that is described, rounded to the nearest whole integer. For example, about 100 mm, would include 90 to 110 mm. Unless otherwise noted, the term "about" refers to ±5% of a percentage number. For example, about 20% would include 15 to 25%. When the term "about" is discussed in terms of a range, then the term refers to the appropriate amount less than the lower limit and more than the upper limit. For example, from about 100 to about 200 mm would include from 90 to 220 mm.

Unless otherwise noted, the term "substantially perpendicular to" means perpendicular to within plus or minus 20 degrees.

Unless otherwise noted, the term "substantially parallel to" means parallel to within plus or minus 20 degrees.

Unless otherwise noted, properties (height, width, length, ratio etc.) as described herein are understood to be averaged measurements.

Figure 2:
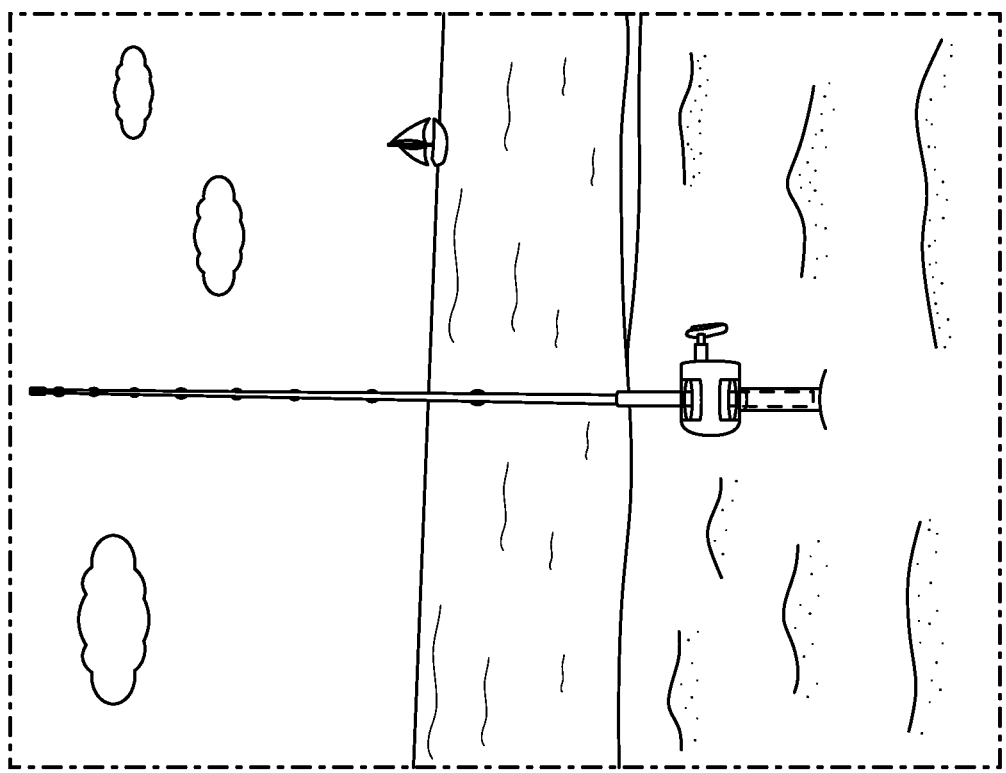
FIG. 2 is an illustration of a conventional fishing rod holder driven into the ground and holding a fishing rod during fishing.
Figure 1:
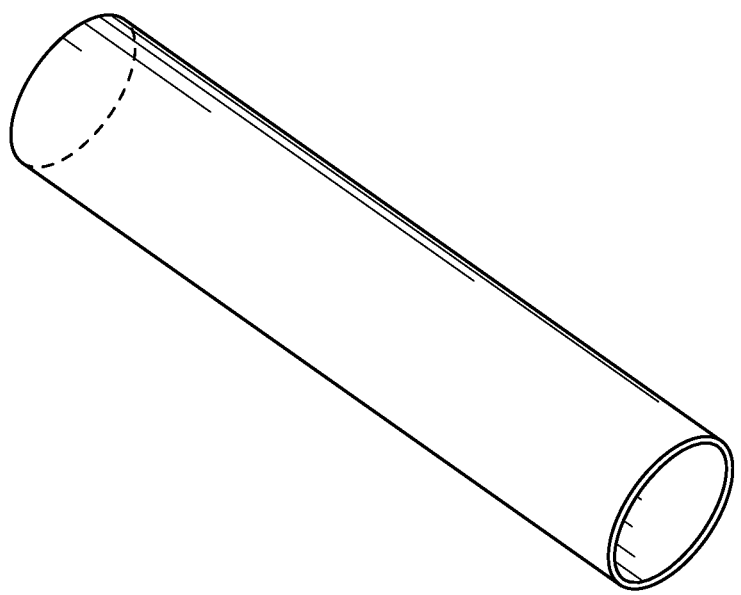
FIG. 1 is a schematic depiction of conventional fishing rod holder.

Many recreational fishers enjoy hiking to remote locations off the beaten path to find the perfect fishing spot. Fishing is a beloved sport and pastime that many fishers are willing to invest money in. For example, many fishers are willing to spend thousands of dollars to purchase high end fishing rods and reels. However, despite how much most fishers are willing to spend on the actual rod and reel, the fishing rod holders that are commonly used are basically just a conventional pipe, see FIG. 1, shoved into the ground, as illustrated in FIG. 2. These conventional fishing rod holders are valued because they are cheap, lightweight, and durable. However, these conventional fishing rod holders do not actually secure the fishing rod in the fishing rod holder, leaving it to bang around when a fish bites the end of the line or if it is windy outside. This banging around tends to damage the fisher's costly fishing rod. Also, there is the possibility that their pipe, being ill suited to being driven into the ground, might tip over and allow for their fishing rod to be dragged in the water by a fish.

Moreover, these conventional fishing rods, like everything else, have to be transported by the fisher to the fishing spot, which is typically a remote location with few conveniences. Therefore, the fisher will only have those tools and conveniences that the fisher brings with them. For example, many fishers find that they need someplace to work with their lines to place bait on the fishing hooks. However, there is no convenient place to do so. Many fishers like to hang up their jacket once it gets warmer or drink a beverage, such as a beer, or enjoy the use of their cell phone, only to find that there's no convenient place to hang their jacket, no secure spot to sit their beer, and they often have to hold their cell phone the entire time they want to interact with it.

A fishing rod platform has been discovered. The fishing rod platform disclosed herein solves the aforementioned problems. For example, rather than relying upon the ability of the fisher to drive the end of a pipe into dirt, sand, or gravel, the fishing rod platform is modular and can include a ground spike. This ground spike make is easy for the fishing rod platform to be quickly and easily driven securely into the ground. In some embodiments, the ground spike can then be reversibly attached to a fishing rod holder. Also, the fishing rod platform it is designed to secure the fishing rod in recess designed to accommodate fishing rods, which prevents or reduces the sort of banging around that can occur when just using a pipe to hold the fishing rod. It has also been discovered that the fishing rod platform can include side openings on the fishing rod holder that allow for clips bearing functional arms to be attached to the fishing rod holder. In this way, the fishing rod platform can act as a single platform for holding multiple items. For example, the fishing rod platform can hold the fishing pole and, optionally, other holders such as a cell phone holder, a cup holder, a double hook holder, and/or a bait processing station. With all of these improvements over the conventional fishing rod holder, the fishing rod platforms disclosed herein should be well positioned to revolutionize the way recreational fishers enjoy their favorite pastime, fishing in remote locations.

Figure 3:
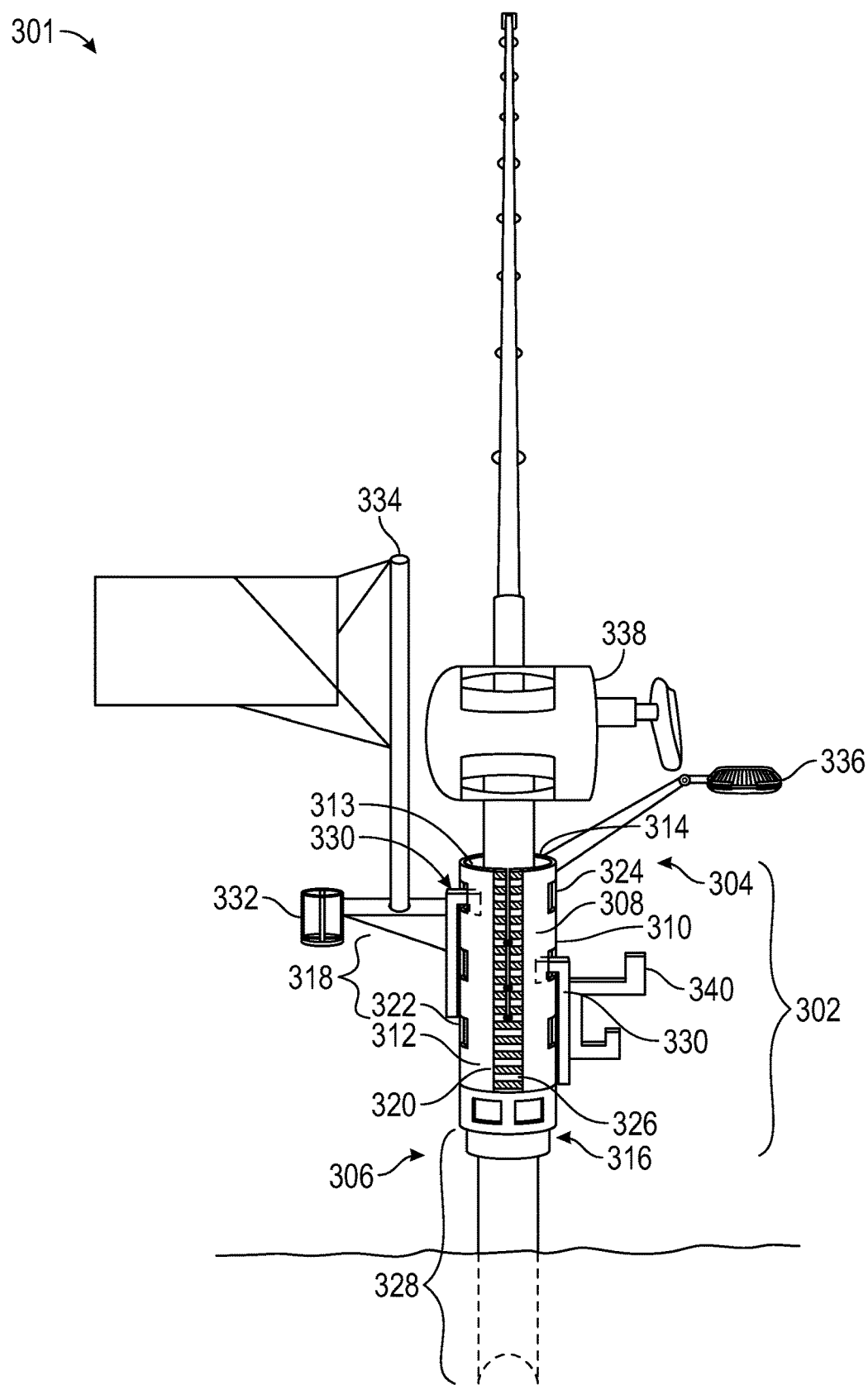
FIG. 3 is a schematic depiction of an embodiment of a fishing rod platform holding a fishing rod and presenting functional arms.

In some embodiments, referring to FIG. 3, the fishing rod platform 301 includes a fishing rod holder 302, wherein the fishing rod holder has a hollow tubular shape and includes a top end 304, a bottom end 306, a front face 308, a back face (not shown), a right face 310, a left face 312, and an inner surface 313, wherein the top end has a top opening 314 that includes a top lip and the bottom end has a bottom opening 316 that includes a bottom lip, wherein the fishing rod holder has a front slit 318 that passes through the front face to the inner surface and extends a front slit distance from the top lip toward the bottom end and has a plurality of front circular openings 320 spaced along the front slit distance, and wherein the fishing rod holder has a back slit (not shown) that passes through the back face to the inner surface and extends a back slit distance from the top lip toward the bottom end and has a plurality of back circular openings (not shown) spaced along the back slit distance, wherein the fishing rod holder has one or more left openings 322 that pass through the left face to the inner surface, and wherein the fishing rod holder has one or more right openings 324 that pass through the right face to the inner surface, and the front face has a pattern of ridges 326 extending along from the top lip to the bottom lip. In FIG. 3, the ground spike 328 is already reversibly attached to the fishing rod holder 302. Further, the fishing rod holder is depicted as having clips 330 attached to the right and left face of the fishing rod holder through the openings 322, 324. The clips bear or are attached to functional arms, which include a cup holder 332, an awning 334, a fish cleaning station 336, and a double hook 340. The fishing rod holder of the fishing rod platform is of course depicted as holding a fishing rod and reel 338.

Figure 4:
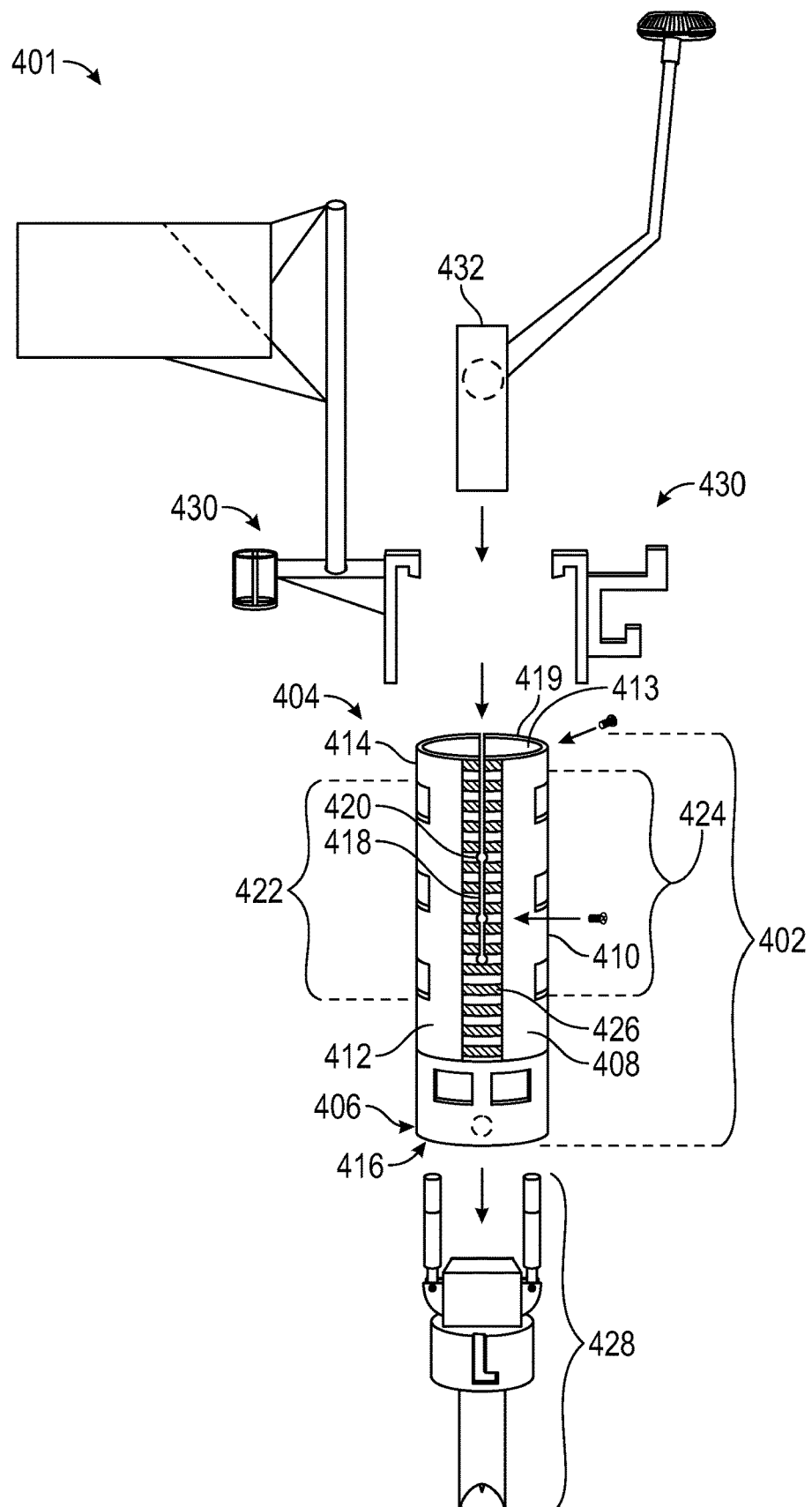
FIG. 4 is a schematic exploded diagram depicting how the components of the fishing rod platform can be assembled to form an embodiment of the fishing rod platform.

FIG. 4 is an exploded diagram of FIG. 3 without the fishing rod and reel. In more detail, in some embodiments, referring to FIG. 4, the fishing rod platform 401 includes a fishing rod holder 402, wherein the fishing rod holder has a hollow tubular shape and includes a top end 404, a bottom end 406, a front face 408, a back face (not shown), a right face 410, a left face 412, and an inner surface 413, wherein the top end has a top opening 414 that includes a top lip and the bottom end has a bottom opening 416 that includes a bottom lip, wherein the fishing rod holder has a front slit 418 that passes through the front face to the inner surface and extends a front slit distance from the top lip toward the bottom end and has a plurality of front circular openings 420 spaced along the front slit distance, and wherein the fishing rod holder has a back slit 419 (only partially shown) that passes through the back face to the inner surface and extends a back slit distance from the top lip toward the bottom end and has a plurality of back circular openings (not shown) spaced along the back slit distance, wherein the fishing rod holder has one or more left openings 422 that pass through the left face to the inner surface, and wherein the fishing rod holder has one or more right openings 424 that pass through the right face to the inner surface, and the front face has a pattern of ridges 426 extending along from the top lip to the bottom lip. In FIG. 3, the ground spike 428 is reversibly detached from the fishing rod holder 402. Further, the fishing rod holder is depicted as having clips 430 detached from the openings 422, 424 of the fishing rod holder.

Figure 5:
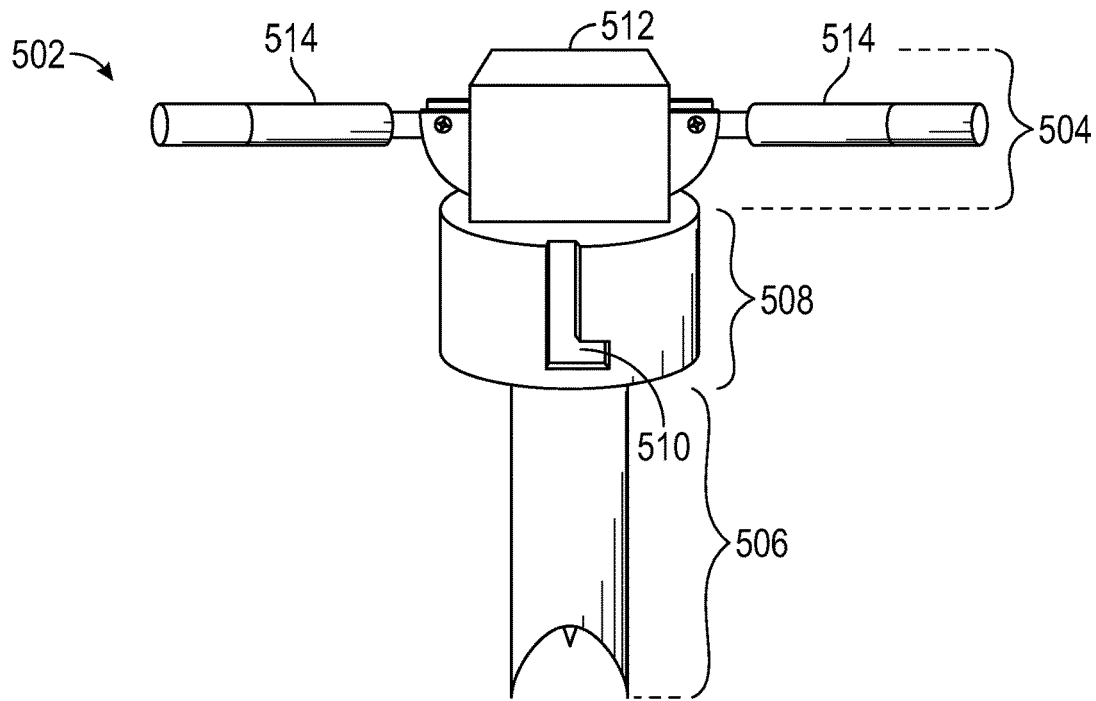
FIG. 5 is a schematic depiction of an embodiment of the ground spike from FIGS. 3 and 4 with the driving mechanism in an expanded position.
Figure 6:
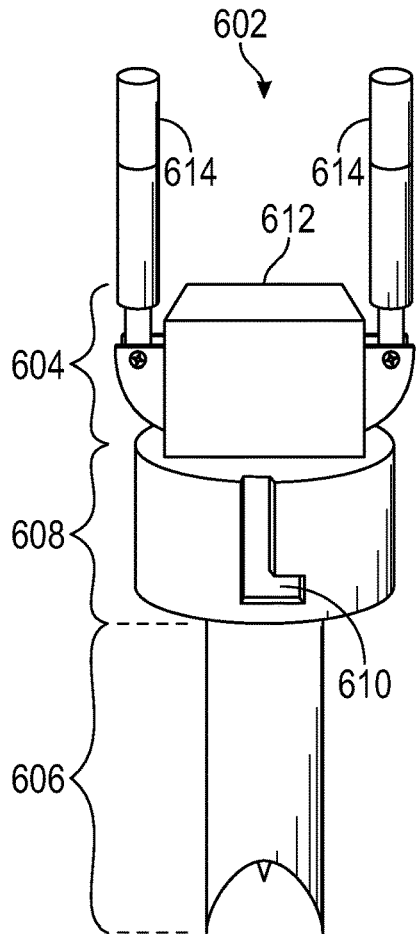
FIG. 6 is a schematic depiction of an embodiment of the ground spike from FIG. 5 with the driving mechanism in a collapsed position.

Referring to FIGS. 5 and FIG. 6, in some embodiments, the fishing rod platform includes a ground spike 502, 602, wherein the ground spike has a driving mechanism 504, 604 on top, a ground blade 506, 606 on bottom, and a fastening mount 508, 608 located between and connected to the driving mechanism and the ground blade, and the bottom of the fishing rod holder has a complementary fastening mechanism 510, 610 configured to allow the fishing rod holder to be reversibly fastened to the fastening mount. In FIG. 5, driving mechanism 504 of the ground spike is depicted in the driving position with the handles 514 oriented in a direction substantially perpendicular to a length of the ground blade. This expanded or driving position allows the user to push on the handle and use their weight to drive the ground spike into the ground. Alternatively, the user can use another part of the driving mechanism, namely, raised platform 512, 612 as a designated surface for pounding the ground spike into the ground using a tool such as a hammer.

Figure 7:
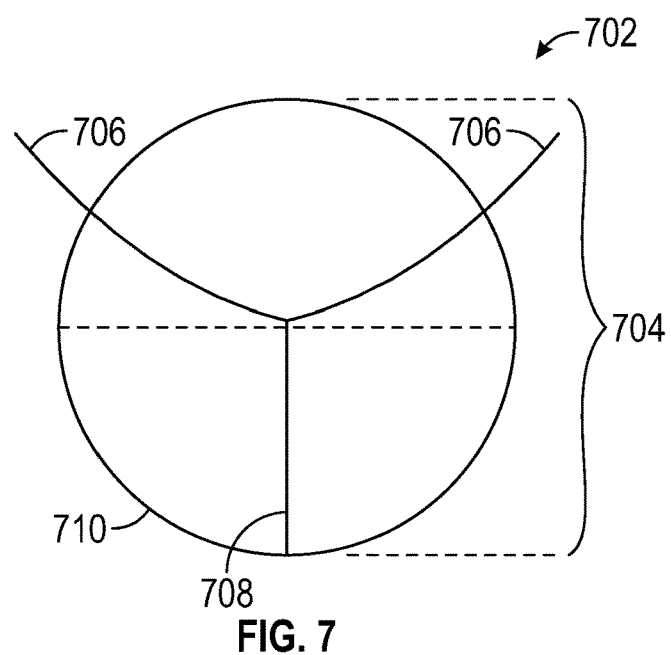
FIG. 7 is a schematic depiction of an embodiment of the ground spike looking down a length of the ground blade.

In FIG. 6, the driving mechanism 604 of the ground spike is depicted in the collapsed or folded position with the handles 614 oriented in a direction substantially parallel to a length of the ground blade. This position allows the bottom opening of the fishing rod holder to fit over the driving mechanism and to be fastened to the fastening mount. FIG. 7 depicts an embodiment of the ground spike 702 from the bottom looking along the edge the ground blade. From this view, looking down a central axis running through the center of the ground spike, it can be seen that the shape of the ground blade is not planar. Instead, the shape of the ground blade extends along 2 connected edges 706, defining a flat, curved shape, and one straight edge 708. As will be discussed, this shape can help the ground blade avoid cutting through the ground in unintended ways, which prevents or reduces the possibility of the fastening mount 710 toppling over and hitting the ground.

Figure 9:
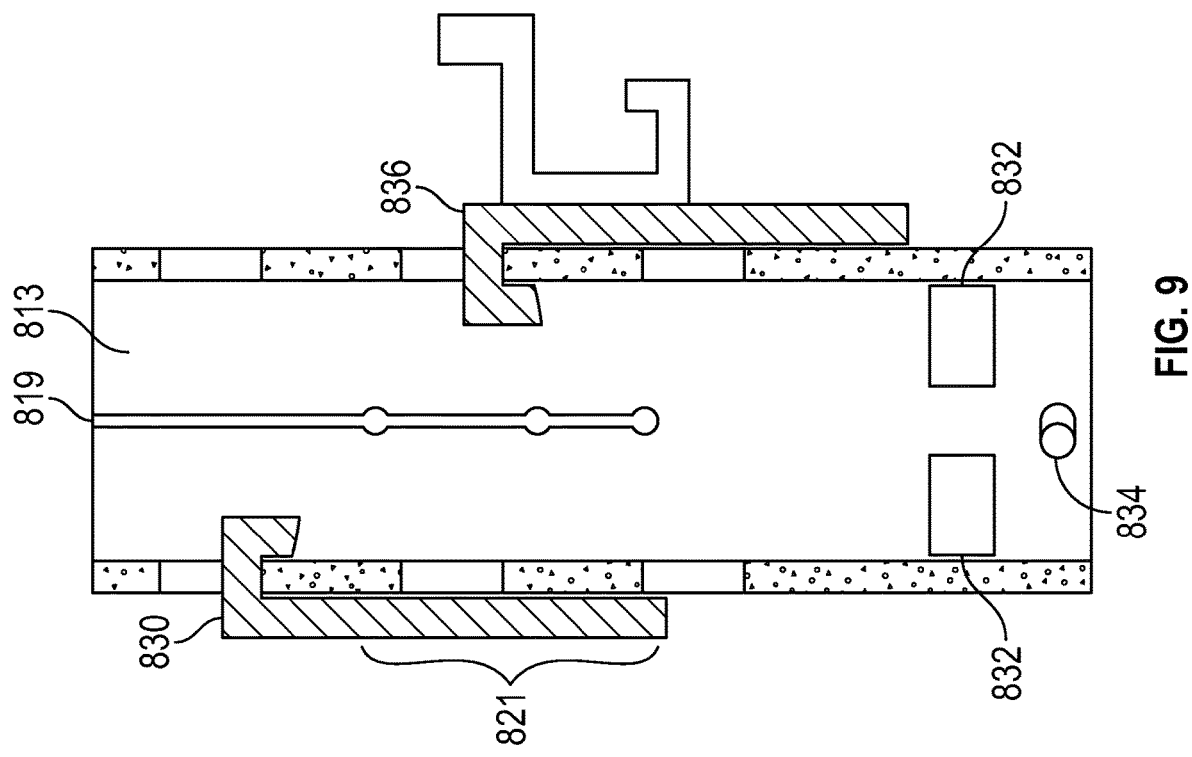
FIG. 9 is a cut away illustration of the embodiment of the fishing rod holder of FIG. 8 with two embodiments of clips attached to the fishing rod holder.
Figure 8:
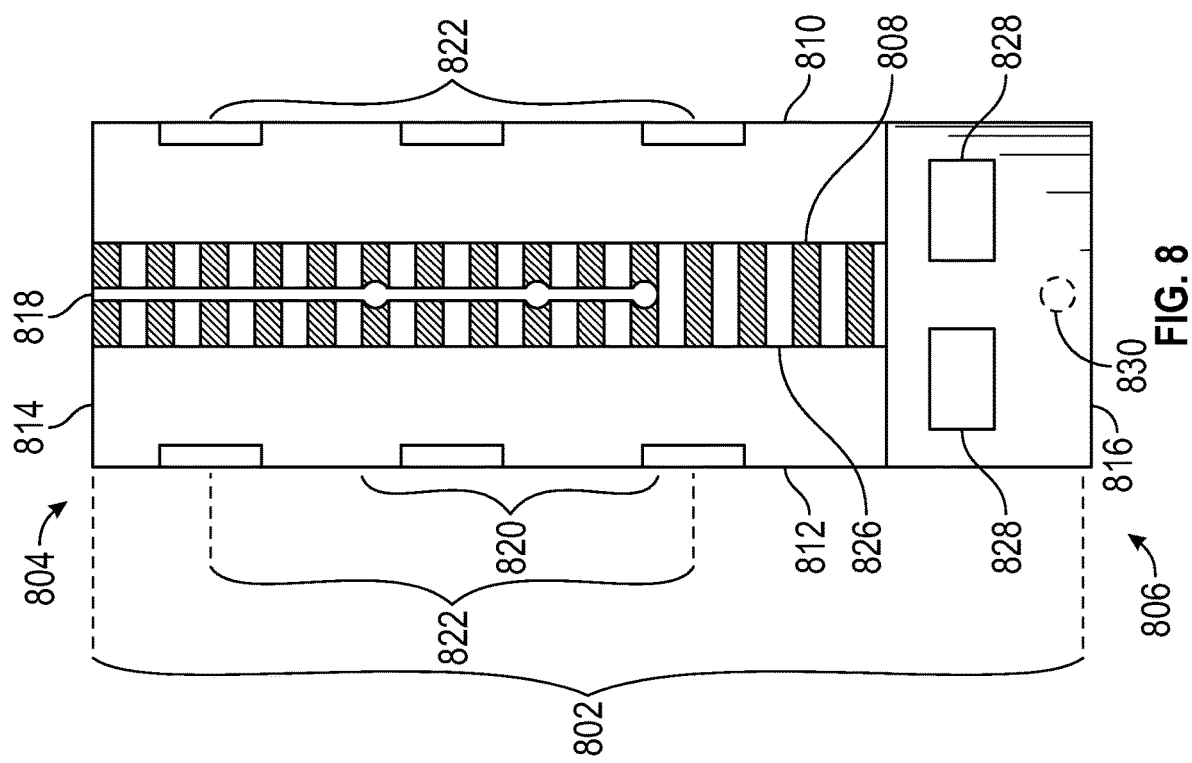
FIG. 8 is a schematic depiction of an embodiment of a fishing rod holder.

Focusing on the fishing rod holder, in some embodiments, referring to FIG. 8 (outside view) and FIG. 9 (cutaway view of FIG. 8), the fishing rod platform includes a fishing rod holder 802, wherein the fishing rod holder has a hollow tubular shape and includes a top end 804, a bottom end 806, a front face 808, a back face (not shown), a right face 810, a left face 812, and an inner surface 813, wherein the top end has a top opening 814 that includes a top lip and the bottom end has a bottom opening 816 that includes a bottom lip, wherein the fishing rod holder has a front slit 818 that passes through the front face to the inner surface and extends a front slit distance from the top lip toward the bottom end and has a plurality of front circular openings 820 spaced along the front slit distance, and wherein the fishing rod holder has a back slit 819 that passes through the back face to the inner surface and extends a back slit distance from the top lip toward the bottom end and has a plurality of back circular openings 821 spaced along the back slit distance, wherein the fishing rod holder has one or more left openings 822 that pass through the left face to the inner surface, and wherein the fishing rod holder has one or more right openings 824 that pass through the right face to the inner surface, and the front face has a pattern of ridges 826 extending along from the top lip to the bottom lip. In FIG. 9, the clips 836 are attached through the right and left side openings by clipping them on to the right and left faces, respectively. Similar to the openings on the right face and the left face, in some embodiments, the fishing rod holder can also have front openings 828 in the front face and back openings 832 in the back face. Also, in some embodiments, the fishing rod holder can include a fastening mechanism that is located or in the fishing rod holder. In FIG. 8 and FIG. 9, a tongue or peg 830, 834 as shown on the inner surface 813 of the fishing rod holder. The tongue is capable of engaging with the grooves of the fastening mount of the ground spike to reversibly attach the fishing rod holder to the ground spike.

Figure 11:
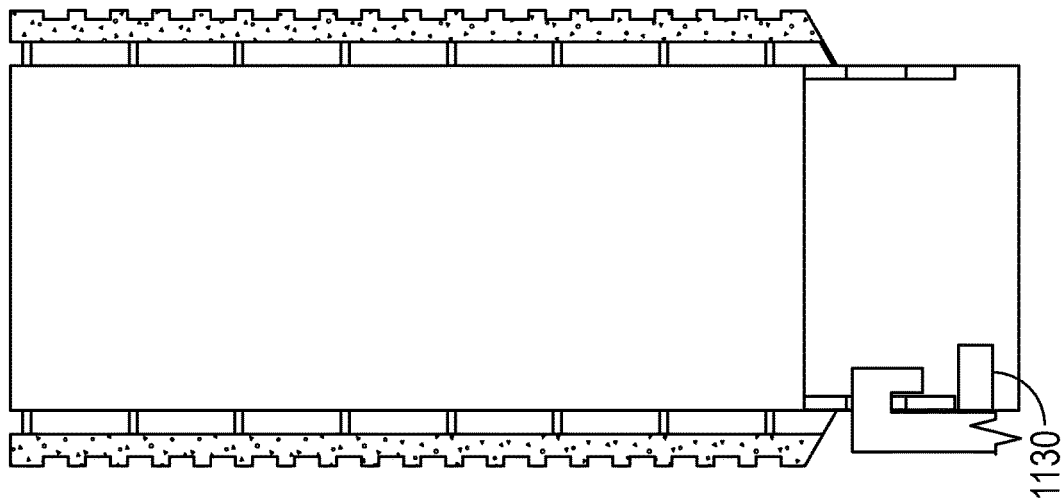
FIG. 11 is a cut away illustration of the embodiment of the fishing rod holder of FIG. 10 with an embodiment of a clip attached to the fishing rod holder.
Figure 10:
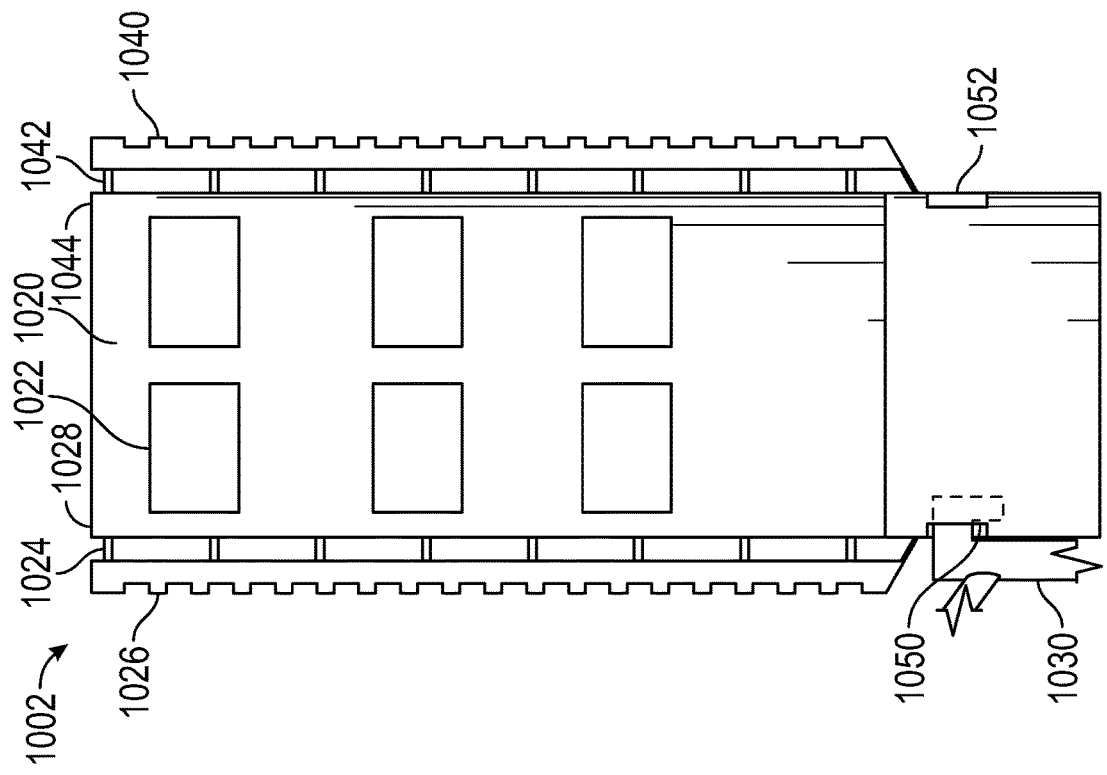
FIG. 10 is a schematic depiction of the embodiment of the fishing rod holder in FIG. 8, shown from the right side and having an embodiment of a clip attached to the front of the fishing rod holder.

FIG. 10 presents an outside view of an embodiment of the fishing rod holder 1002 as viewed from the right side. In the right face 1020, there are right side openings 1022 where clips can be mounted or fastened onto the right face. From this view, it can be seen that the raised ridges 1026 are held onto to the front face 1028 of the fishing rod holder by front spacers 1024. In some embodiments, as shown, the raised ridges can be held onto to the back face 1044 of the fishing rod holder by back spacers 1042. In FIG. 10, the fishing rod holder is depicted as having front openings 1050 in the front face and back openings 1052 in the back face toward the bottom end of the fishing rod holder with a clip 1030 fastened through front opening 1050. In FIG. 11, which is a cut away of FIG. 10, in some embodiments, the tongue or peg 1130 is only located on the front inner surface. In this embodiment, there are no left side openings in FIG. 11.

Figure 12:
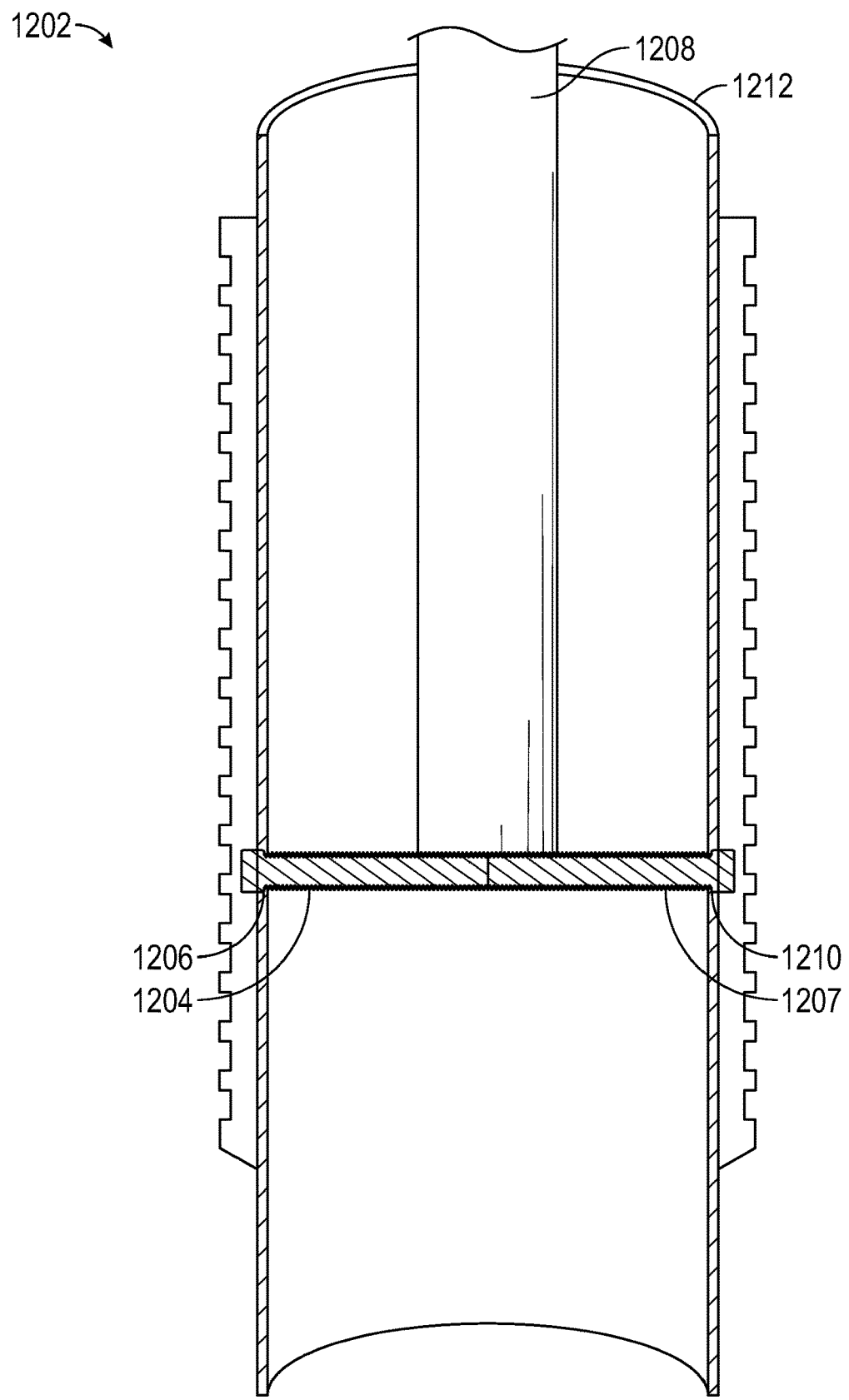
FIG. 12 is a schematic depiction of an embodiment of a fishing rod holder holding a fishing rod.

FIG. 12 is an illustration of how some embodiments of the fishing rod holder hold the fishing rod. FIG. 12 is a cut away view of the fishing rod holder 1202 as seen from the right side and does not have left openings. In FIG. 12, a front screw 1204 has been inserted through a front circular opening 1206 toward the center of the tubular fishing rod holder. Similarly, a back screw 1207 has been inserted through a back circular opening 1210 toward the center of the tubular fishing rod holder. The fishing rod 1208 can be inserted through the top opening an allowed to rest on top of the front screw and the back screw, which can avoid or reduce the likelihood for the fishing reel (not shown) resting directly on the top opening of the fishing rod holder.

Figures 13A, 13B, 13C:
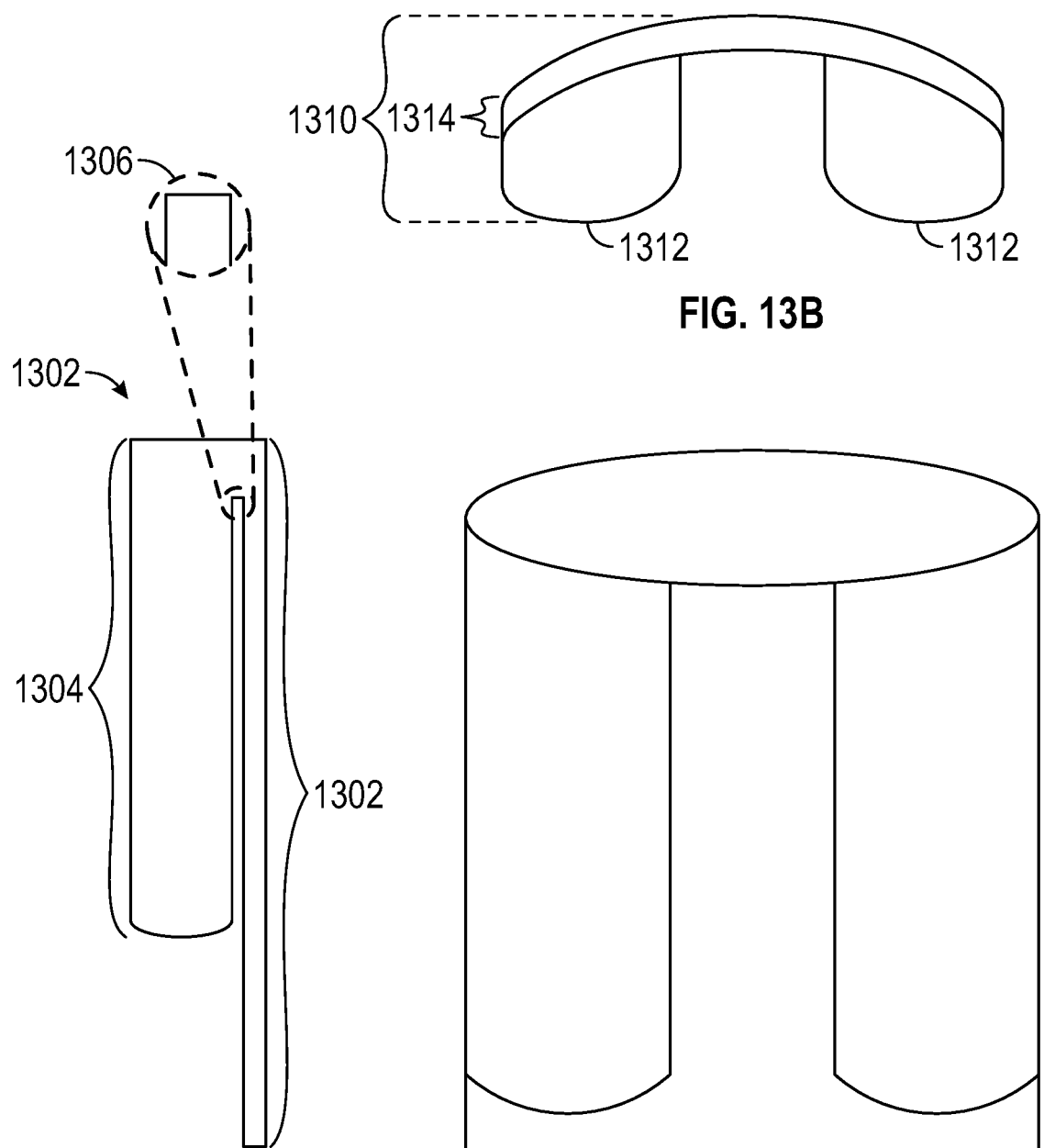
FIG. 13 is a schematic depiction of an embodiment of a clip, with FIG. 13A as a side view, FIG. 13B as a top view, and FIG. 13C as a posterior view.

FIG. 13A, FIG. 13B, and FIG. 13C are schematic depictions of a clip without any functional attachment as viewed from different angles. Referring to FIG. 13A, the clip 1302 has one or more teeth 1304 that are separated by a gap 1306 from a clip body 1308. FIG. 13B shows the clip of FIG. 13A from the tooth or ridge side of the clip. Referring to FIG. 13C, a top view of the clip 1310 is shown, wherein the two or more teeth 1312 extend from the clip body 1314 toward a radius of curvature of the clip body. The radius of curvature of the clip body is designed to be complementary to curvature of the right face or left face surrounding the right opening or the left opening, respectively, such that the teeth of a clip are capable of being hooked through the right opening or the left opening, respectively. What is meant by complementary in this context is that the spacing of the gap 1306 is greater than the width of the thickness material just below the left opening, the right opening, the front opening, or the back opening of the fishing rod holder. Also, the radius of curvature of the clip body and the clip teeth generally matches that of the face of the fishing rod holder, such that the clip can be fastened onto a face of the fishing rod holder through the left opening, right opening, front opening, or back opening, and the clip body will lay flush or snug against the left face, right face, front face, or back face of the fishing rod holder, respectively.

FIG. 14 is a schematic depiction of a clip bearing a functionalized arm, wherein the functionalized arm is or includes a double hook. FIG. 14A presents a view of the clip bearing the double hook from the side. FIG. 14B presents a view of the clip bearing the double hook of FIG. 14A as shown looking along a length of the hooks. FIGS. 14C and 14D present a view of the clip bearing the double hook of FIG. 14A shown from the top, looking down on the hooks.

Figure 15:
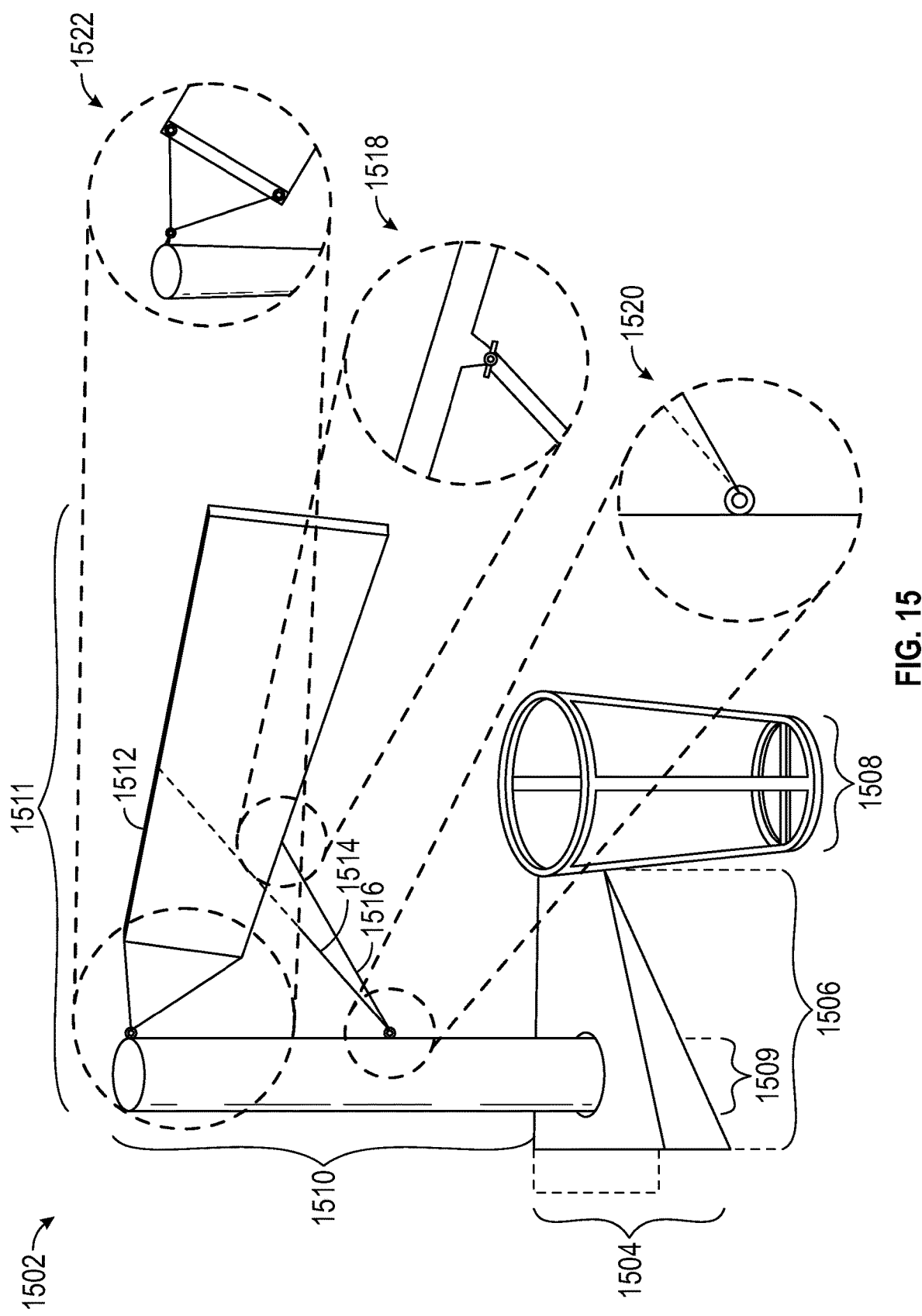
FIG. 15 is a schematic depiction of an embodiment of a clip having a cup holder and an awning attached.

FIG. 15 is this schematic depiction of a multi-functionalized clip 1502. In an embodiment, the multi-functionalized clip 1504 has a functional arm 1506 that terminates in a cup holder 1508 and has a hole or recess in the arm 1509 that is capable of supporting an awning pole or awning support 1510, which is part of an awning assembly 1511. The awning 1512 contains a stiff material that keeps the awning planar. When assembled, the awning is held aloft by a stiff rod 1514 that attaches to the bottom of the awning, as shown in 1518, and a stiff rod 1516 that attaches to the top of the awning (not shown), wherein both stiff rods also attach to the bottom of the awning support, as shown in 1520. The awning is also supported by a wire that attaches to the top of the awning and the bottom of the awning and also attaches to the top of the awning support, as shown in 1522. The combination of these supports allows the awning a degree of movement while still holding the awning in a position that can be easily viewed from a distance. The awning assembly is modular and is designed to be easily assembled in the field.

Figure 16:
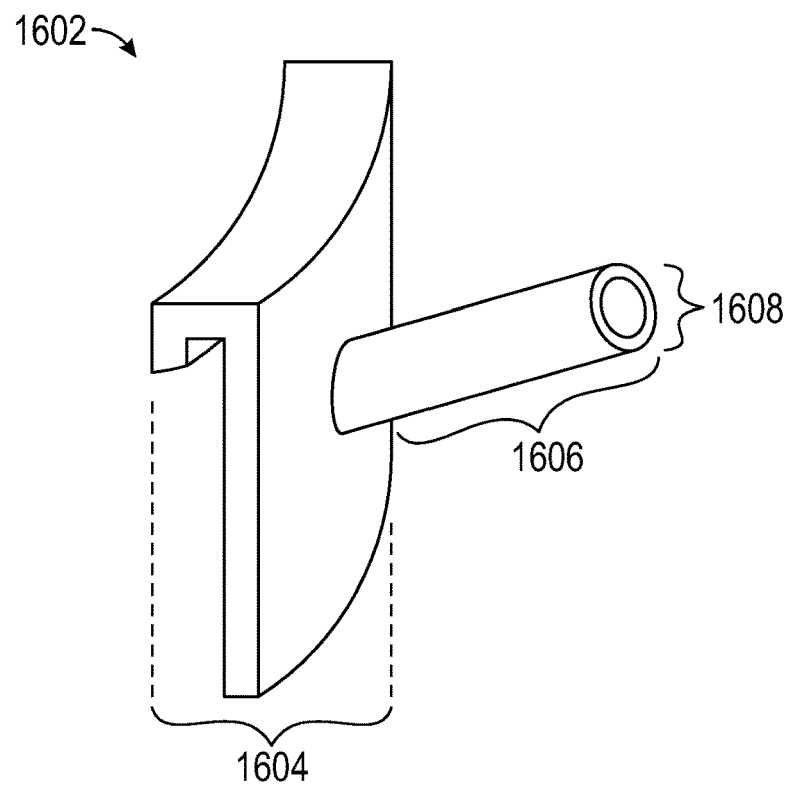
FIG. 16 is a schematic depiction of an embodiment of a clip having functional arm bearing a bait fishing rod holder recess.
Figure 17:
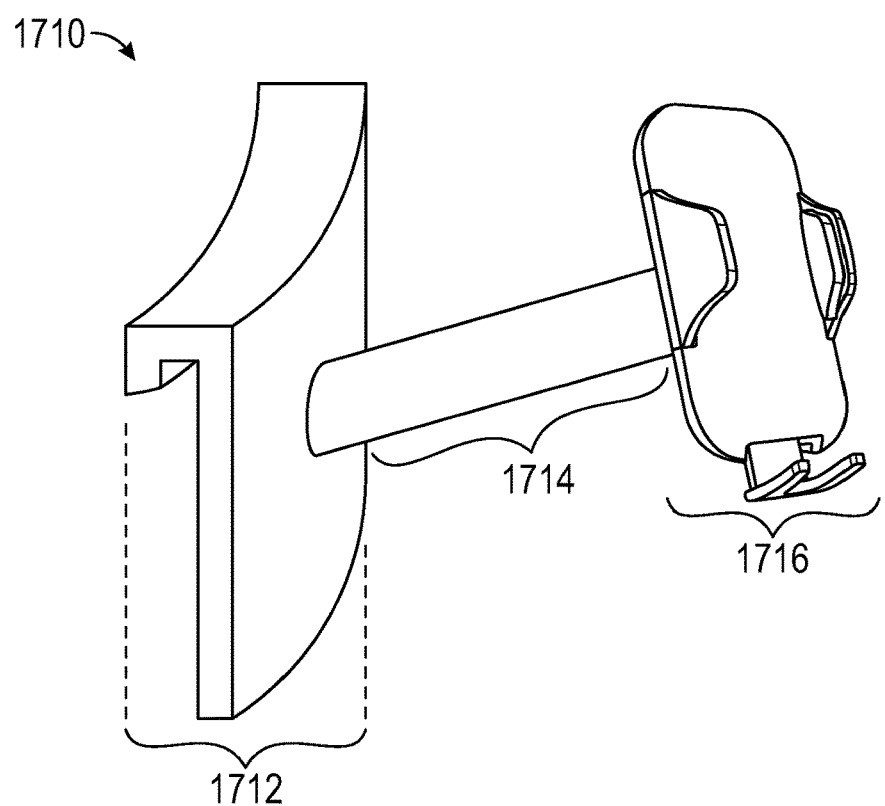
FIG. 17 is a schematic depiction of an embodiment of a clip having functional arm bearing a cellphone holder on the end.

FIG. 16 is a schematic depiction of a bait rod holder clip 1602, which is a clip 1604 having a functional arm 1606, that terminates in a hollow recess 1608 capable of accommodating a fishing rod. The bait rod holder can allow for a second fishing pole to be mounted onto the fishing rod platform, so that smaller fish can be caught and used as bait. FIG. 17 is a schematic depiction of a cellphone holder clip 1710, which is a clip 1712 having a functional arm 1714 that terminates in a cell phone holder 1716. The cell phone holder can hold a cell phone in position with respect to the fishing rod platform, so that a user can watch hands free videos and the like.

Figure 18:
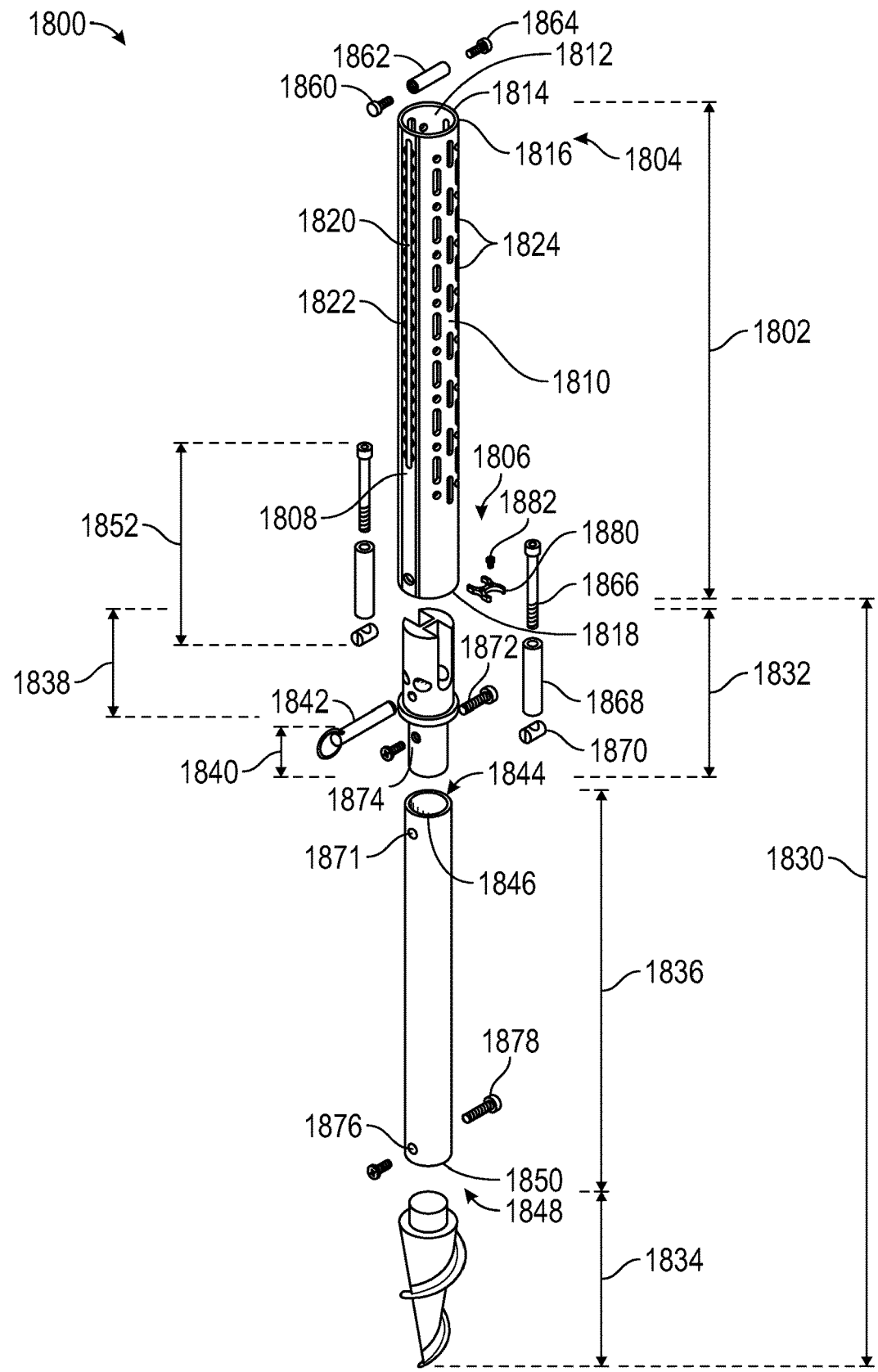
FIG. 18 is a schematic depiction of an exploded diagram of an embodiment fishing rod platform prior to assembly.

Referring to FIG. 18, an embodiment of the fishing rod platform is shown using an exploded diagram. The fishing rod platform 1800 includes a fishing rod holder 1802, wherein the fishing rod holder has a hollow tubular shape and includes a top end 1804, a bottom end 1806, a front face 1808, a back face (not shown), a right face 1810, a left face (not shown), and an inner surface 1812. The top end has a top opening 1814 that includes a top lip 1816 and the bottom end 1806 has a bottom opening (not shown) that includes a bottom lip 1818. The fishing rod holder has a front slit 1820 that passes through the front face to the inner surface and extends a front slit distance from the top lip toward the bottom end and has a plurality of front notches 1822 spaced along the front slit distance. The fishing rod holder has one or more right openings 1824 that pass through the right face to the inner surface.

In this embodiment, the fishing rod platform includes a ground spike 1830. The ground spike has a driving mechanism 1832 on top, a ground blade 1834 on bottom, and a fastening mount 1836 located between and connected to the driving mechanism and the ground blade. The driving mechanism includes a driving top 1838 and a driving bottom 1840, wherein the bottom lip of the fishing rod holder can fit over the driving top of the driving mechanism such that the bottom lip directly contacts a top of the fastening mount, and the fastening mount and the bottom of the fishing rod holder have a complementary fastening mechanism 1842 configured to allow the fishing rod holder to be reversibly fastened to the fastening mount. In this embodiment, the complementary fastening mechanism is a ball lock pin with pull ring.

The fastening mount has hollow tubular shape and includes a mount top end 1844 having a mount top lip 1846 and mount bottom end 1848 having a mount bottom lip 1850, and wherein the mount top end and mount bottom end have one or more holes passing from an exterior of the fastening mount to an interior of the fastening mount are complementary to one or more holes in the ground blade and driving mechanism. As shown, the fastening mount has a bottom mount hole 1876 and top mount hole 1879 for securing with a bottom mount hole bolt 1878 and a top mount hole bolt 1874. These bolts can be reversibly or permanently fastened into place, such that after a first assembly the ground spike would not be disassembled during regular use, excluding maintenance or deep cleaning.

The driving mechanism include includes two adjustable handles 1852 capable of being fixed in a driving position (not shown) or a collapsed position (shown by suggested positing), wherein the driving position orients a length of the handles in a direction substantially perpendicular to a length of the ground blade and the collapsed position orients the length of the handles substantially parallel to the length of the ground blade, and the fishing rod holder is capable of fitting over the driving top and being fastened to the fastening mount when the handles of the driving mechanism are in the collapsed position.

In more detail, the fishing rod platform includes a front holder bolt 1860 and a back holder bolt 1864 that can fit through a fishing rod position pin 1862, when the bolt and positioner are positioned at various front and back notches through front and back slits, respectively. The fishing rod positioner sets the lowest depth that a fishing rod can be inserted into the fishing rod holder of the fishing rod platform. In this embodiment, the adjustable handles can include a handle bolt 1866 inserted into a handle grip 1868 that inserts into a handle pivot 1870. In the embodiment shown, the driving spike of the fishing rod platform includes a handle clip 1880 fastened to the top of the driving top, wherein the handle clip is configured to hold the adjustable handles in the collapsed position. A benefit of such a handle clip can be that the adjustable handles resist accidently falling down into the open position during assembly and also resist rattling around during transportation.

Referring to FIG. 19A, an embodiment of a fishing rod holder 1900 is from front view. The fishing rod holder 1900 has a hollow tubular shape and includes a top end 1904, a bottom end 1906, a front face 1908, a back face (not shown), a right face 1910, a left face 1912, wherein the top end has a top opening (not shown) that includes a top lip 1905 and the bottom end has a bottom opening (not shown) that includes a bottom lip 1907, wherein the fishing rod holder has a front slit 1914 that passes through the front face to the inner surface (not shown) and extends a front slit distance 1916 from the top lip toward the bottom end and has a plurality of front notches 1918 spaced along the front slit distance and a plurality of back notches 1919 spaced along the back slit distance, and wherein the fishing rod holder has one or more left openings 1920 that pass through the left face to the inner surface, and wherein the fishing rod holder has one or more right openings 1922 that pass through the right face to the inner surface. The front slit has a front gap width 1924, the front notch closest to the top lip has a center located about a top notch distance 1924 from the top lip, and the notches have a distance between adjacent notches 1926. Referring to FIG. 19B, this is a cut-away diagram, viewed from the right side of the fishing rod holder, with the inner surface 1911 of fishing rod holder visible and the left side of the fishing rod holder has pairs of left openings 1930, passing from the inner surface to the left face, which can be used for reversibly attaching a clip having a pair of teeth to mount functional side arms. The fishing rod holder also had additional openings 1932. A benefit of these additional openings can be to render the fishing rod holder more aesthetically pleasing, to facilitate grip, to lessen the amount of material needed for fabrication, and reduce the weight of the fishing rod holder by removing unneeded material.

Figure 20B:
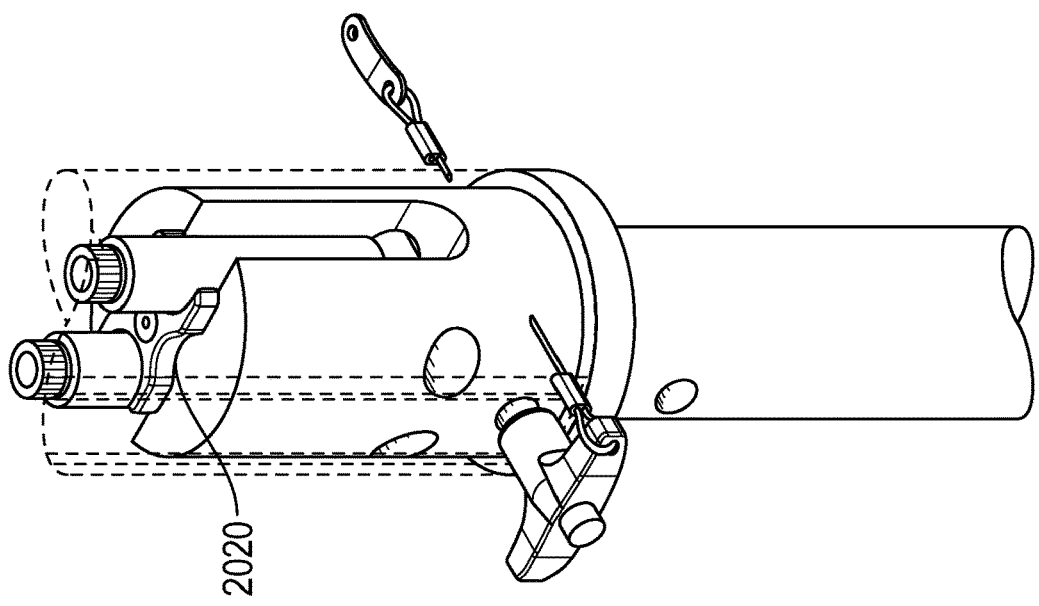
FIG. 20B is a schematic depiction of a diagram of the middle of the fishing rod platform shown in FIG. 20A, after assembly and with the adjustable handles in the collapsed position.
Figure 20A:
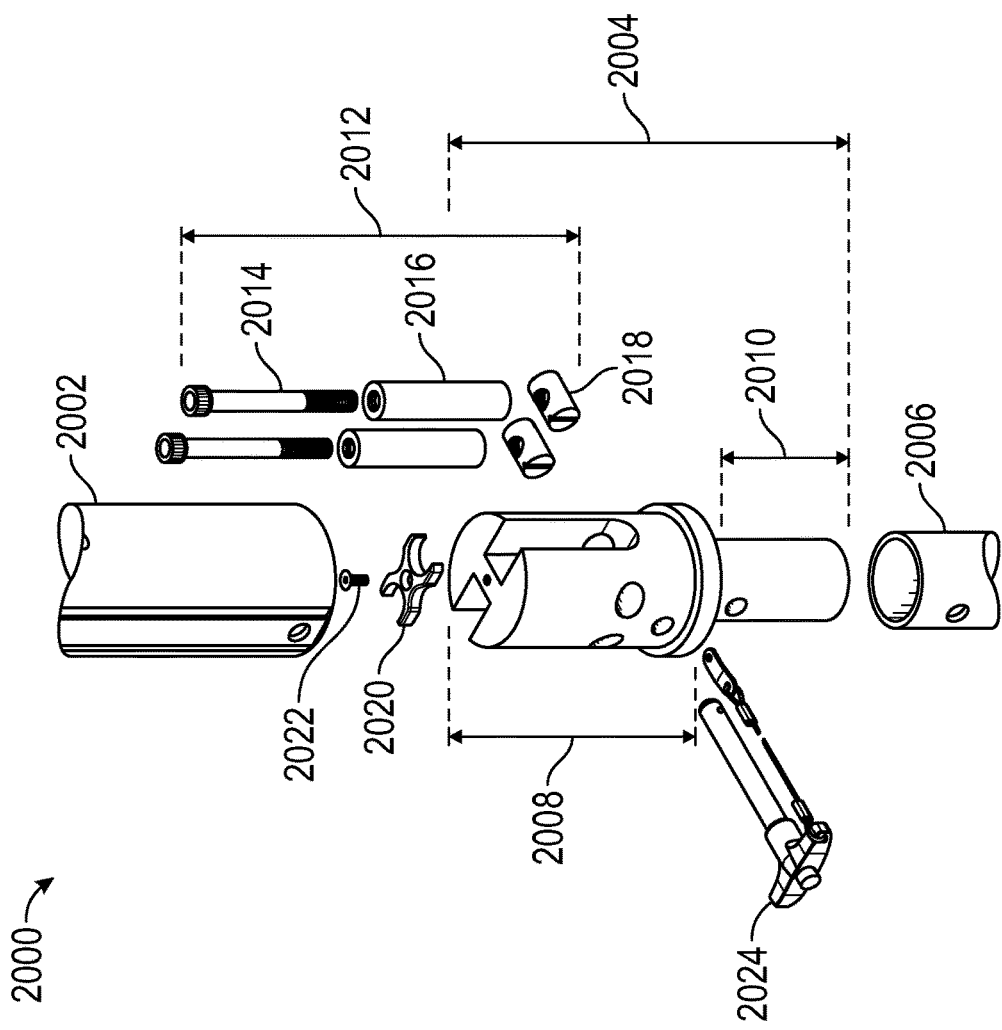
FIG. 20A is a schematic depiction of an exploded diagram showing a close-up view of the middle of the fishing rod platform shown in FIG. 18.

FIG. 20A shows a closeup of the embodiment of the fishing rod platform 2000 from FIG. 18, before assembly. The fishing rod holder 2002 attaches to the driving mechanism 2004, which attaches to the fastening mount 2006. The driving mount has a driving top 2008 configured to fasten to and be complementary to the fishing rod holder and a driving bottom 2010 configured to fasten to and be complementary to the fastening mount. The driving mechanism has handles or adjustable handles 2012. The adjustable handles can be made of a handle bolt 2014, a handle grip 2016, and a handle pivot 2018. The adjustable handles can be held in the collapsed position by a handle clip 2020. The handle clip can be fastened to the top of the driving top of the driving mechanism by a clip bolt 2022. When assembled the fishing rod holder can be quickly, easily, and reversibly fastened to the driving top of the driving mechanism by a complementary fastening mechanism 2024, here shown as a quick release ball lock pin with pull ring.

FIG. 20B shows a diagram of the fishing rod platform of 20A assembled, such that the adjustable handles and driving top are located within the bottom opening of the fishing rod holder.

In an embodiment, the fishing rod platform includes a fishing rod holder, wherein the fishing rod holder has a hollow tubular shape and includes a top end, a bottom end, a front face, a back face, a right face, a left face, and an inner surface. In an embodiment of the fishing rod platform, the top end has a top opening that includes a top lip and the bottom end has a bottom opening that includes a bottom lip. In an embodiment of the fishing rod platform, the fishing rod holder has a front slit that passes through the front face to the inner surface and extends a front slit distance from the top lip toward the bottom end and has a plurality of front circular openings spaced along the front slit distance, and/or wherein the fishing rod holder has a back slit that passes through the back face to the inner surface and extends a back slit distance from the top lip toward the bottom end and has a plurality of back circular openings spaced along the back slit distance.

In some embodiments, the fishing rod holder has a front slit, a back slit, or both. The front face, back face, left face, and right face of the fishing rod holder are terms of convenience. Generally, when the fishing rod holder is viewed from a side having a slit, then the closest side is the front face, the farthest side is the back face, the side viewed on the right is the right face, and the side viewed on the left is the left face. In some embodiments, having 2 slits, then these orienting terms become interchangeable and one of the slits may be arbitrarily labeled as the front slit in the front face, which then orients the rest of these terms. In some embodiments, the purpose of the slit in the fishing rod holder is to allow for the recess of the fishing rod holder to accommodate fishing rod handles of various lengths securely. In some embodiments of the fishing rod holder the front or back slit does not extends to fishing rod holder top or the top lip. In some embodiments of the fishing rod holder, the front or back slit extends to top lip. One benefit of the slit of the fishing rod extending to the top lip can be allowing for the fishing rod holder to expand slightly to accommodate fishing rods of different widths and that the material of the fishing rod holder tends to flex back and hold the fishing rod in place. In an embodiment, the front slit has a front gap width of from about 3 mm to about 12 mm, including from about 4 mm to about 6 mm. In an embodiment, the back slit has a back gap width of from about 3 mm to about 12 mm, including from about 4 mm to about 6 mm. In some embodiments, the front slit and the back slit are oriented exactly opposite of each other. In some embodiments, the front slit and the back slit are oriented to each other by an angle of from about 90 to 180 degrees as measured from the front slit to the center of the fishing rod holder.

In some embodiments, the fishing rod holder has from 2 to about 50 front circular openings, including from 3, 4, 5, or 6 front circular openings. In some embodiments, the fishing rod holder has from 2 to about 50 back circular openings, including from 3, 4, 5, or 6 back circular openings. In some embodiments, the number of front circular openings and back circular openings is the same or different. In some embodiments, a first front circular opening has a center located about 30 cm from the top lip, or from about 25 cm to about 35 cm from the top lip. In some embodiments, a second front circular opening has a center located about 45 cm from the top lip, including from about 40 cm to about 50 cm from the top lip. In some embodiments, a third front circular opening has a center located about 70 cm from the top lip, or from about 65 cm to about 75 cm from the top lip. In some embodiments, a back circular opening has a center located about 30 cm from the top lip, or from about 25 cm to about 35 cm from the top lip. In an embodiment, a second back circular opening has a center located about 45 cm from the top lip, including from 40 cm to about 50 cm from the top lip. In an embodiment, a third back circular opening has a center located about 70 cm from the top lip, or from about 65 cm to about 75 cm from the top lip. The terms first, second, and third as used for the circular openings are relative terms and set by their proximity to the top lip of the fishing rod holder. By way of explanation, if only one circular opening is present, then that one circular opening would be the "first" circular opening. If two circular openings are present, then the closest one to the top would be the "first" and the next closest would be the "second" circular opening. The plurality of circular openings, along the front and back slit, allow for a set of screws to be inserted into the fishing rod holder, which defines the lowest position in which the fishing rod is capable of sitting. A benefit of the plurality of circular openings and the fishing rod screws is commercial fishing rods having different lengths of handle can be allowed to enter the fishing rod far enough to be held securely, but the rig or reel of the fishing rod would not be allowed to actually sit against the top lip of the top opening of the fishing rod holder. A benefit of this design can be minimizing damage to the fishing rod and reel when the fishing rod is pushed about by wind or pulled by a fish.

In some embodiments of the fishing rod platform, the fishing rod holder has a holder length of from about 50.0 cm to about 250.0 cm, including from about 60.0 cm to about 240.0 cm. In some embodiments of the fishing rod platform, a longest distance across an inner surface of the top lip is from about 5.0 cm to about 17.0 cm, including from about 6.0 cm to about 16.0 cm. In some embodiments of the fishing rod platform, a longest distance across an inner surface of the bottom lip is from about 5.0 cm to about 17.0 cm, including from about 6.0 cm to about 16.0 cm. In an embodiment, if the top opening or the bottom opening of the fishing rod holder is a circle, then the longest distance across an inner surface of the top or bottom lip can be replaced with internal diameter. In some embodiments, the longest distance across an inner surface of the top lip and the longest distance across an inner surface of the bottom lip can be the same or different. In some embodiments of the fishing rod platform, a thickness of the fishing rod holder can be from about 1.0 cm to about 3.0 cm, including from about 1.5 cm to about 2.5 cm. A benefit of the fishing rod holder length can be the positioning of the fishing rod at a convenient level for manipulation by a user. A benefit of the longest distance across the inner surface of the top and bottom lip can be allowing the fishing rod holder to accommodate a variety of fishing rods having handles of a variety of different widths. The thickness of the fishing rod holder is not generally limited. The choice of material and thickness of the material used in the fishing rod holder needs to be thick enough for the material used to be strong and durable while being as light as possible for transportation.

In some embodiments of the fishing rod platform, the fishing rod holder has one or more left openings that pass through the left face to the inner surface, or the fishing rod holder has one or more right openings that pass through the right face to the inner surface, or both. In some embodiments of the fishing rod platform, the fishing rod holder has one or more front openings that pass through the front face to the inner surface. In some embodiments of the fishing rod platform, the fishing rod holder has one or more back openings that pass through the back face to the inner surface. In some embodiments of the fishing rod platform, the fishing rod holder has from 2 to about 100 right or left openings, including from 2, 3, 4, 5, 6, 7, 8, 9, 10, 11, 12, 13, 14, 15, or 16 right or left openings. In some embodiments, the left or right openings include pairs or triples of openings at the same distance from the top lip. In some embodiments, the left or right openings include single openings at different distances from the top lip.

In some embodiments of the fishing rod platform, the front face has a pattern of ridges extending along from about 50% to 100% of a length from the top lip to the bottom lip, wherein the pattern of ridges has ridges that are oriented substantially perpendicular to the length from the top lip to the bottom lip. In some embodiments of the fishing rod platform, the back face has a pattern of ridges extending along from about 50% to 100% of a length from the top lip to the bottom lip, wherein the pattern of ridges has ridges that are oriented substantially perpendicular to the length from the top lip to the bottom lip. In some embodiments of the fishing rod platform, the front face and the back face have a pattern of ridges as described above. In some embodiments of the fishing rod platform, there is no pattern of ridges. A benefit of the pattern of ridges can be to facilitate a user's grip on the fishing rod holder during transportation or assembly. Another benefit of the pattern of ridges can be to protect a user's hand from getting cut or irritated by the fishing rod screws once the fishing rod screws are inserted into the circular openings.

In some embodiments, the fishing rod platform includes a ground spike. In some embodiments, the ground spike has a driving mechanism on top, a ground blade on bottom, and a fastening mount located between and connected to the driving mechanism and the ground blade. In some embodiments, the ground spike includes a ground blade attached to a fastening mount and excludes a driving mechanism. In some embodiments, the bottom lip of the fishing rod holder can fit over the driving mechanism such that the bottom lip directly contacts a top of the fastening mount, and the fastening mount and the bottom of the fishing rod holder have a complementary fastening mechanism configured to allow the fishing rod holder to be reversibly fastened to the fastening mount.

In some embodiments, the ground blade has a blade length from fastening mount to tip of about 12.7 cm, 22.8 cm, 30.48 cm; or 45 cm, 61 cm, 91, cm; or from about 30 to about 120 cm. A benefit of the ground blade having different lengths can be the ability to adapt for different types of soil. For example, a longer ground blade might be used for loose sand and a shorter blade for thick mud. Also, a different length of ground blade can help to adapt the position of the fishing rod holder relative to the height of the user, which can make using the fishing rod and any functionalized arms more accessible and convenient for user. In some embodiments, the ground blade can be a single flat blade curved angled along the axis that would be perpendicular to the ground. In some embodiments, the ground blade can be multiple blades. A benefit of the shape of the ground blade can include improving the ability of the ground blade to hold the fishing rod platform upright. For example, if the ground blade were a straight, flat blade, such as commonly found in a kitchen knife, then the ground blade would likely cut through the ground, in the direction of a sharp edge, allowing the fishing rod platform to topple over during high winds or when a fish pulls on the fishing rod line.

In some embodiments, the fishing rod platform includes a complementary fastening mechanism. The complementary fastening mechanism is not generally limited so long as it is quickly and easily capable of reversibly attaching or securing the fishing rod holder to the ground spike. In an embodiment, the complementary fastening mechanism includes a tongue or peg located on an inner surface of the fishing rod holder and a groove located on the fastening mount of the ground spike. It should be understood that what is meant by a "complementary" fastening mechanism is that it is a mechanism or one or more parts of a mechanism that are complementary between the fishing rod holder and the ground spike and capable of fastening the fishing rod holder reversibly to the ground spike. For example, in a tongue and groove mechanism, it is the tongue that is complementary to the groove and the two together form the complementary fastening mechanism. In an embodiment, the complementary fastening mechanism can include one, two, or three tongues on the fishing rod holder that compliment one, two, or three grooves on the ground spike, such that the grooves are oriented so rotating the fishing rod holder and one direction relative to the ground spike fastens the fishing rod holder to the ground spike, but rotating in the fishing rod holder in the opposite direction relative to the ground spike unfastens the fishing rod holder from the ground spike. This could be accomplished by having each of the grooves in an L groove shape having the bottom portion extend in a clockwise direction. Alternatively, this could be accomplished by having each of the grooves in an L groove shape having the bottom portion extend in a counterclockwise direction.

In an embodiment, the ground spike includes a driving mechanism that includes a raised platform. A benefit of the raised platform can include having a specific place for a user to pound the ground spike into the ground using a hammer. A suitable raised platform is one that can withstand multiple hammer strikes.

A method of assembling a fishing rod platform is disclosed herein. In some embodiments, the method of assembling the fishing rod platform can include providing a fishing rod holder, as described herein, and driving the lower lip of fishing rod holder directly into the ground. In some embodiments, the method of assembling the fishing rod platform can include providing a fishing rod holder, as described herein, and providing a ground spike, as described herein, and fastening the fishing rod holder to the ground spike, and then driving the blade of the ground spike into the ground. In some embodiments, the method of assembling the fishing rod platform can include providing a ground spike, as described herein, driving the blade of the ground spike into the ground, and fastening a fishing rod holder, as described herein, to the ground spike.

DISCUSSION OF EMBODIMENTS

Embodiment 1. A fishing rod platform comprising:
a fishing rod holder, wherein the fishing rod holder has a hollow tubular shape and includes a top end, a bottom end, a front face, a back face, a right face, a left face, and an inner surface,
wherein the top end has a top opening that includes a top lip and the bottom end has a bottom opening that includes a bottom lip,
wherein the fishing rod holder has a front slit that passes through the front face to the inner surface and extends a front slit distance from the top lip toward the bottom end and has a plurality of front circular openings spaced along the front slit distance, and
wherein the fishing rod holder has a back slit that passes through the back face to the inner surface and extends a back slit distance from the top lip toward the bottom end and has a plurality of back circular openings spaced along the back slit distance,
wherein the fishing rod holder has one or more left openings that pass through the left face to the inner surface, and
wherein the fishing rod holder has one or more right openings that pass through the right face to the inner surface.

Embodiment 2. The fishing rod platform of one or more of embodiments 1 or 3-12,
wherein the fishing rod holder has a holder length of from about 50.0 cm to about 150.0 cm, or
wherein a longest distance across an inner surface of the top lip is from about 5.0 cm to about 17.0 cm, or
wherein a longest distance across an inner surface of the bottom lip is from about 5.0 cm to about 17.0 cm, or
wherein a thickness of the fishing rod holder is from about 1.0 cm to about 3.0 cm, or
wherein a shape of the top opening or the bottom opening is circular, or
wherein a shape of the top opening or the bottom opening is ovular or elliptical.

Embodiment 3. The fishing rod platform of embodiment one or more of embodiments 1-2 or 4-12, wherein the front slit has a front gap width of from about 3 mm to about 7 mm; or
wherein the back slit has a back gap width of from about 3 mm to about 7 mm; or
wherein the fishing rod holder has from 2 to about 7 front circular openings, and
wherein a first front circular opening having a center located about 30 cm from the top lip, or wherein a second front circular opening having a center located about 45 cm from the top lip, or wherein a third front circular opening having a center located about 70 cm from the top lip; or
wherein the fishing rod holder has from 2 to about 7 back circular openings, and wherein a first back circular opening having a center located about 30 cm from the top lip, or wherein a second back circular opening having a center located about 45 cm from the top lip, or wherein a second back circular opening having a center located about 70 cm from the top lip.

Embodiment 4. The fishing rod platform of one or more of embodiments 1-3 or 5-12, wherein the fishing rod holder has from 2 to about 20 left openings, wherein left openings have a left bottom lip that is substantially perpendicular to a length of the fishing rod holder, and wherein the left openings form an array of pairs of left openings spaced at different distances from the top lip, or wherein the fishing rod holder has from 2 to about 20 right openings, wherein right openings have a right bottom lip that is substantially perpendicular to a length of the fishing rod holder, and wherein the right openings form an array of pairs of right openings spaced at different distances from the top lip.

Embodiment 5. The fishing rod platform of one or more of embodiments 1-4 or 6-12, wherein the front face has a pattern of ridges extending along from about 50% to 100% of a length from the top lip to the bottom lip, wherein the pattern of ridges has ridges that are oriented substantially perpendicular to the length from the top lip to the bottom lip.

Embodiment 6. The fishing rod platform of one or more of embodiments 1-5 or 7-12, further comprising a ground spike, wherein the ground spike has a driving mechanism on top, a ground blade on bottom, and a fastening mount located between and connected to the driving mechanism and the ground blade, wherein the bottom lip of the fishing rod holder can fit over the driving mechanism such that the bottom lip directly contacts a top of the fastening mount, and the fastening mount and the bottom of the fishing rod holder have a complementary fastening mechanism configured to allow the fishing rod holder to be reversibly fastened to the fastening mount.

Embodiment 7. The fishing rod platform of one or more of embodiments 1-6 or 8-12, wherein the ground blade has a blade length from fastening mount to tip of about 45 cm; or wherein the ground blade has a blade length from fastening mount to tip of about 61 cm; or wherein the ground blade has a blade length from fastening mount to tip of about 91 cm; and wherein the ground blade has a non-planar shape along an axis substantially parallel to the length of the ground blade, or wherein the ground blade has a curved shape along an axis substantially parallel to the length of the ground blade.

Embodiment 8. The fishing rod platform of one or more of embodiments 1-7 or 9-12, wherein the complementary fastening mechanism includes a tongue and groove, complimentary threading, a nut and bolt, or a hook and loop; or wherein the complementary fastening mechanism includes a pair of L-shaped, J-shaped, or V-shaped tongue and groove locks disposed around the fastening mount such that rotating the fishing rod holder in a fastening direction relative to the fastening mount fastens the fishing rod holder to the fastening mount and rotating the fishing rod holder in a direction opposite the fastening direction unfastens the fishing rod holder from the fastening mount.

Embodiment 9. The fishing rod platform of one or more of embodiments 1-8 or 10-12, wherein the driving mechanism include one or more handles; or wherein the driving mechanism includes a raised platform; or wherein the driving mechanism includes two adjustable handles capable of being fixed in a driving position or a collapsed position, wherein the driving position orients a length of the handles in a direction substantially perpendicular to a length of the ground blade and the collapsed position orients the length of the handles substantially parallel to the length of the ground blade, and the fishing rod holder is capable of fitting over the driving mechanism and being fastened to the fastening mount when the handles of the driving mechanism are in the collapsed position.

Embodiment 10. The fishing rod platform of one or more of embodiments 1-9 or 11-12, further comprising a clip, wherein the clip has one or more teeth and is configured to reversibly attach to the left opening or the right opening of the fishing rod holder.

Embodiment 11. The fishing rod platform of one or more of embodiments 1-10 or 12, further comprising a clip, wherein the clip has a clip body, two or more teeth, and a functional arm, wherein the clip body has an inner surface having a curvature that complements a curvature of the front face, the back face, the right face, or the left face of the fishing rod holder, wherein the two or more teeth extend from the clip body toward a radius of curvature of the clip body and are complementary to the right opening or the left opening such that the teeth of a clip are capable of being hooked through the right opening or the left opening.

Embodiment 12. The fishing rod platform of one or more of embodiments 1-11, wherein the functional arm includes a plurality of hooks, an arm bearing a cup holder, an arm bearing an awning, and an arm bearing a plate or fish cleaning station, bait rod holder, mobile device holder, or a combination thereof, wherein the mobile device holder is configured to hold a cell phone, a computer tablet, a display screen, a camera, a fish finder, a flashlight, or a combination thereof.

Embodiment 13. A method of assembling a fishing rod platform comprising:

providing a fishing rod holder, wherein the fishing rod holder has a hollow tubular shape and includes a top end, a bottom end, a front face, a back face, a right face, a left face, and an inner surface, wherein the top end has a top opening that includes a top lip and the bottom end has a bottom opening that includes a bottom lip, wherein the fishing rod holder has a front slit that passes through the front face to the inner surface and extends a front slit distance from the top lip toward the bottom end and has a plurality of front circular openings spaced along the front slit distance, and wherein the fishing rod holder has a back slit that passes through the back face to the inner surface and extends a back slit distance from the top lip toward the bottom end and has a plurality of back circular openings spaced along the back slit distance, wherein the fishing rod holder has one or more left openings that pass through the left face to the inner surface, and wherein the fishing rod holder has one or more right openings that pass through the right face to the inner surface, and providing a ground spike, wherein the ground spike has a driving mechanism on top, a ground blade on bottom, and a fastening mount located between the driving mechanism and the ground blade, wherein the bottom lip of the fishing rod holder can fit over the driving mechanism into direct contact with the fastening mount, and the fastening mount and the bottom of the fishing rod holder have a complementary fastening mechanism configured to allow the fishing rod holder to be reversibly fastened to the fastening mount, positioning the lower lip of the fishing rod holder against the fastening mount, forming the assembled fishing rod platform by fastening the fishing rod holder to the fastening mount.

Embodiment 14. The method of one or more of embodiments 13 or 15, further comprising: before, during, or after forming the assembled fishing rod platform, driving the ground blade in sand, gravel, dirt, mud, or any surface terranean feature.

Embodiment 15. The method of one or more of embodiments 13 or 14, further comprising:

providing a clip, wherein the clip has a clip body, two or more teeth, and a functional arm, wherein the clip body has an inner surface having a curvature that complements a curvature of the front face, the back face, the right face, or the left face of the fishing rod holder, wherein the two or more teeth extend from the clip body toward a radius of curvature of the clip body and are capable of being clipped through and onto the right opening or the left opening, and fastening the clip onto the left face by passing two or more teeth of the clip through the left opening, or fastening the clip onto the right face by passing two or more teeth of the clip through the right opening.

EXAMPLES

The ground spike and fishing rod holder can be three-dimensional (3D) printed or machined from steel, carbon fiber, or aluminum alloys.

3D printing can use a large format 3D printer designed for production environments. This printer can use Computer Numerical Control (CNC) core structure combined with printheads to produce a physical object based off the design and measurements entered into the computer system. This option for production of both the ground spike and fishing rod holder would be useful due to its ease and efficient production time of each fishing rod platform. The 3D printer is able to utilize a variety of materials including various metals, plastics, rubber, or carbon fiber to produce the fishing rod platform.

Machining via utilization of CNC manufacturing would also be a practical option to create the fishing rod platform. This process is by means of using computerized manufacturing in which pre-programmed software and codes control the movement of production equipment to achieve precise cuts. The production of the fishing rod platform using CNC machining can be completed with aluminum or steel alloys.

The clips bearing functional arms can be created using the same 3D printing process as described or with CNC machining. The use of injection molding using a polyurethane or another suitable polymer could also be utilized for the clips to ensure precise replica are created on a large-scale production.

What is claimed is:

1. A fishing rod platform comprising:
a fishing rod holder, wherein the fishing rod holder has a hollow tubular shape and includes a top end, a bottom end, a front face, a back face, a right face, a left face, and an inner surface,
wherein the top end has a top opening that includes a top lip and the bottom end has a bottom opening that includes a bottom lip,
wherein the fishing rod holder has a front slit that passes through the front face to the inner surface and extends a front slit distance from the top lip toward the bottom end and has a plurality of front notches spaced along the front slit distance, and
wherein the fishing rod holder has a back slit that passes through the back face to the inner surface and extends a back slit distance from the top lip toward the bottom end and has a plurality of back notches spaced along the back slit distance,
wherein the fishing rod holder has one or more left openings that pass through the left face to the inner surface, and
wherein the fishing rod holder has one or more right openings that pass through the right face to the inner surface.

2. The fishing rod platform of claim 1,
wherein the fishing rod holder has a holder length of from about 50.0 cm to about 250.0 cm, or
wherein a longest distance across an inner surface of the top lip is from about 5.0 cm to about 17.0 cm, or
wherein a longest distance across an inner surface of the bottom lip is from about 5.0 cm to about 17.0 cm, or
wherein a thickness of the fishing rod holder from the front face to the inner surface is from about 0.3 cm to about 2.0 cm, or
wherein a shape of the top opening or the bottom opening is circular, or
wherein a shape of the top opening or the bottom opening is ovular, elliptical, rectangular, pentagonal, hexagonal, heptagonal, or octagonal.

3. The fishing rod platform of claim 1, wherein the front slit has a front gap width of from about 3.0 mm to about 20.0 mm; or
wherein the back slit has a back gap width of from about 3.0 mm to about 20.0 mm; or
wherein the fishing rod holder has from 2 to about 50 front notches, and
wherein a front notch closest to the top lip has a center located about 0.5 cm from the top lip, or wherein a front notch closest to the bottom lip has a center located about 0.5 cm from the bottom lip; or wherein the front notches have a spacing of about 0.5 cm to about 25.0 cm between adjacent centers of a majority of the front notches; or
wherein the fishing rod holder has from 2 to about 50 back notches, and
wherein a back notch closest to the top lip has a center located about 0.5 cm from the top lip, or wherein a back notch closest to the bottom lip has a center located about 0.5 cm from the bottom lip; or wherein the back notches have a spacing of about 0.5 cm to about 25.0 cm between adjacent centers of a majority of the front notches.

4. The fishing rod platform of claim 1, wherein the one or more left openings include from 2 to about 100 left openings, wherein the left openings have a left bottom lip that is substantially perpendicular to a length of the fishing rod holder or wherein the left openings are located in pairs oriented substantially perpendicular to a length of the fishing rod holder, and wherein the left openings form an array of pairs of left openings spaced at different distances from the top lip, or wherein the one or more right openings include from 2 to about 100 right openings, wherein the right openings have a right bottom lip that is substantially perpendicular to a length of the fishing rod holder or wherein the right openings are located in pairs oriented substantially perpendicular to a length of the fishing rod holder, and wherein the right openings form an array of pairs of right openings spaced at different distances from the top lip.

5. The fishing rod platform of claim 1, further comprising a ground spike, wherein the ground spike has a driving mechanism on top, a ground blade on bottom, and a fastening mount located between and connected to the driving mechanism and the ground blade, wherein the driving mechanism includes a driving top and a driving bottom, wherein the bottom lip of the fishing rod holder can fit over the driving top of the driving mechanism such that the bottom lip directly contacts a top of the fastening mount, and the fastening mount and the bottom of the fishing rod holder have a complementary fastening mechanism configured to allow the fishing rod holder to be reversibly fastened to the fastening mount.

6. The fishing rod platform of claim 5, wherein the ground blade has a blade length of about 8.0 cm to about 55.0 cm; or wherein the ground blade has a curved shape along an axis substantially parallel to the length of the ground blade.

7. The fishing rod platform of claim 5, wherein the complementary fastening mechanism includes a tongue and groove, complimentary threading, a hook and loop, or complementary holes securable with a pin, a ball lock pin, a ball lock pin with pull ring, or a nut and bolt; or wherein the complementary fastening mechanism includes a pair of L-shaped, J-shaped, or V-shaped tongue and groove locks disposed around the fastening mount such that rotating the fishing rod holder in a fastening direction relative to the fastening mount fastens the fishing rod holder to the fastening mount and rotating the fishing rod holder in a direction opposite the fastening direction unfastens the fishing rod holder from the fastening mount.

8. The fishing rod platform of claim 5, wherein the fastening mount has hollow tubular shape and includes a mount top end having a mount top lip and mount bottom end having a mount bottom lip, and wherein the mount top end and mount bottom end have one or more holes passing from an exterior of the fastening mount to an interior of the fastening mount are complementary to one or more holes in the ground blade and driving mechanism.

9. The fishing rod platform of claim 5, wherein the driving mechanism include one or more handles; or wherein the driving mechanism includes a driving top and a driving bottom, wherein the driving top is capable of being inserted into the bottom opening of the fishing rod holder; or wherein the driving mechanism includes two adjustable handles capable of being fixed in a driving position or a collapsed position, wherein the driving position orients a length of the handles in a direction substantially perpendicular to a length of the ground blade and the collapsed position orients the length of the handles substantially parallel to the length of the ground blade, and the fishing rod holder is capable of fitting over the driving top and being fastened to the fastening mount when the handles of the driving mechanism are in the collapsed position.

10. The fishing rod platform of claim 1, further comprising a clip, wherein the clip has one or more teeth and is configured to reversibly attach to the one or more left openings or the one or more right openings of the fishing rod holder.

11. The fishing rod platform of claim 1, further comprising a clip, wherein the clip has a clip body, two or more teeth, and a functional arm, wherein the clip body has an inner surface having a curvature that complements a curvature of the front face, the back face, the right face, or the left face of the fishing rod holder, wherein the two or more teeth extend from the clip body toward a radius of curvature of the clip body and are complementary to a portion of the one or more right openings or a portion of the one or more left openings such that the teeth of a clip are capable of being hooked through the portion of the one or more right openings or the portion of the one or more left openings; or wherein the clip has a clip body, two teeth, and a functional arm, wherein the clip body has an inner surface having a curvature that complements a curvature of the front face, the back face, the right face, or the left face of the fishing rod holder, wherein the two teeth extend from the clip body toward a radius of curvature of the clip body and are complementary to a pair of the one or more right openings or a pair of the one or more left openings such that the teeth of a clip are capable of being hooked through the pair of the one or more right openings or the pair of the one or more left openings.

12. The fishing rod platform of claim 11, wherein the functional arm includes a plurality of hooks, an arm bearing a cup holder, an arm bearing an awning, and an arm bearing a plate or fish cleaning station, bait rod holder, mobile device holder, or a combination thereof, wherein the mobile device holder is configured to hold a cell phone, a computer tablet, a display screen, a camera, a fish finder, a flashlight, or a combination thereof.

13. A method of assembling a fishing rod platform comprising:

providing a fishing rod holder, wherein the fishing rod holder has a hollow tubular shape and includes a top end, a bottom end, a front face, a back face, a right face, a left face, and an inner surface, wherein the top end has a top opening that includes a top lip and the bottom end has a bottom opening that includes a bottom lip, wherein the fishing rod holder has a front slit that passes through the front face to the inner surface and extends a front slit distance from the top lip toward the bottom end and has a plurality of front notches spaced along the front slit distance, and wherein the fishing rod holder has a back slit that passes through the back face to the inner surface and extends a back slit distance from the top lip toward the bottom end and has a plurality of back notches spaced along the back slit distance, wherein the fishing rod holder has one or more left openings that pass through the left face to the inner surface, and wherein the fishing rod holder has one or more right openings that pass through the right face to the inner surface, and providing a ground spike, wherein the ground spike has a driving mechanism on top, a ground blade on bottom, and a fastening mount located between the driving mechanism and the ground blade wherein the driving mechanism includes a driving top and a driving bottom, wherein the bottom lip of the fishing rod holder can fit over the driving top of the driving mechanism into direct contact with the fastening mount, and the fastening mount and the bottom of the fishing rod holder have a complementary fastening mechanism configured to allow the fishing rod holder to be reversibly fastened to the fastening mount, positioning the lower lip of the fishing rod holder into contact with the fastening mount, forming the assembled fishing rod platform by fastening the fishing rod holder to the fastening mount.

14. The method of claim 13, further comprising: before, during, or after forming the assembled fishing rod platform, driving the ground blade in sand, gravel, dirt, mud, or any surface terranean feature.

15. The method of claim 13, further comprising:

providing a clip, wherein the clip has a clip body, two or more teeth, and a functional arm, wherein the clip body has an inner surface having a curvature that complements a curvature of the front face, the back face, the right face, or the left face of the fishing rod holder, wherein the two or more teeth extend from the clip body toward a radius of curvature of the clip body and are complementary to a portion of the one or more right openings or a portion of the one or more left openings such that the teeth of a clip are capable of being hooked through the portion of the one or more right openings or the portion of the one or more left openings, and fastening the clip onto the left face by passing two or more teeth of the clip through the portion of the one or more left openings, or fastening the clip onto the right face by passing two or more teeth of the clip through the portion of the one or more right openings.

\* \* \* \* \*